US010514928B2

(12) United States Patent
Sideris et al.

(10) Patent No.: US 10,514,928 B2
(45) Date of Patent: *Dec. 24, 2019

(54) PREVENTING DUPLICATE EXECUTION BY SHARING A RESULT BETWEEN DIFFERENT PROCESSING LANES ASSIGNED MICRO-OPERATIONS THAT GENERATE THE SAME RESULT

(71) Applicant: ARM LIMITED, Cambridge (GB)

(72) Inventors: Isidoros Sideris, Cambridge (GB); Daren Croxford, Cambridge (GB); Andrew Burdass, Cambridge (GB)

(73) Assignee: ARM Limited, Cambridge (GB)

( * ) Notice: Subject to any disclaimer, the term of this patent is extended or adjusted under 35 U.S.C. 154(b) by 435 days.

This patent is subject to a terminal disclaimer.

(21) Appl. No.: 14/663,858

(22) Filed: Mar. 20, 2015

(65) Prior Publication Data
US 2015/0301826 A1    Oct. 22, 2015

(30) Foreign Application Priority Data

Apr. 17, 2014  (GR) ............................. 20140100223
Aug. 14, 2014  (GB) ................................. 1414436.4

(51) Int. Cl.
G06F 9/38       (2018.01)
G06F 9/318      (2018.01)
(Continued)

(52) U.S. Cl.
CPC .......... *G06F 9/3869* (2013.01); *G06F 1/3203* (2013.01); *G06F 1/329* (2013.01);
(Continued)

(58) Field of Classification Search
CPC ........ G06F 1/3287; G06F 9/34; G06F 9/3869; G06F 9/3887; G06F 9/3885; Y02D 10/12
See application file for complete search history.

(56) References Cited

U.S. PATENT DOCUMENTS 5,260,898 A    11/1993  Richardson
5,845,103 A    12/1998  Sodani et al.
(Continued)

FOREIGN PATENT DOCUMENTS

EP    1 223 505      7/2002
EP    2 115 629      6/2014
WO    WO 97/34224    9/1997

OTHER PUBLICATIONS

Alvarez et al., "Fuzzy Memoization for Floating-Point Multimedia Applications", IEEE Transactions on Computers, vol. 54, No. 7, Jul. 2005, pp. 922-927.*

(Continued)

Primary Examiner — David J. Huisman
(74) Attorney, Agent, or Firm — Nixon & Vanderhye P.C.

(57) ABSTRACT

A data processing apparatus has control circuitry for detecting whether a first micro-operation to be processed by a first processing lane would give the same result as a second micro-operation processed by a second processing lane. If they would give the same result, then the first micro-operation is prevented from being processed by the first processing lane and the result of the second micro-operation is output as the result of the first micro-operation. This avoids duplication of processing, to save energy for example.

19 Claims, 15 Drawing Sheets

(51) Int. Cl.
*G06F 1/3287* (2019.01)
*G06F 9/30* (2018.01)
*G06F 1/3234* (2019.01)
*G06F 1/3203* (2019.01)
*G06F 1/329* (2019.01)

(52) U.S. Cl.
CPC .......... *G06F 1/3243* (2013.01); *G06F 1/3287* (2013.01); *G06F 9/30181* (2013.01); *G06F 9/3826* (2013.01); *G06F 9/3836* (2013.01); *Y02D 10/12* (2018.01); *Y02D 10/152* (2018.01); *Y02D 10/24* (2018.01); *Y02D 50/20* (2018.01)

(56) References Cited

U.S. PATENT DOCUMENTS

| | | | |
|---|---|---|---|
| 6,401,190 B1* | 6/2002 | Nishioka | G06F 9/30036 712/24 |
| 6,611,920 B1 | 8/2003 | Fletcher | |
| 8,429,380 B2 | 4/2013 | Hayashi | |
| 9,110,814 B2* | 8/2015 | Keramidas | G06F 12/0875 |
| 2003/0037221 A1* | 2/2003 | Gschwind | G06F 9/30043 712/3 |
| 2006/0041722 A1 | 2/2006 | Hakura | |
| 2008/0122228 A1* | 5/2008 | Liu | B60K 6/48 290/40 C |
| 2010/0031269 A1 | 2/2010 | Fontenot | |
| 2010/0180102 A1 | 7/2010 | Almog et al. | |
| 2011/0047349 A1* | 2/2011 | Hayashi | G06F 1/3203 712/22 |
| 2012/0268471 A1 | 10/2012 | Khalvati et al. | |
| 2013/0262908 A1 | 10/2013 | Gomyo | |

OTHER PUBLICATIONS

Sodani et al., "Dynamic Instruction Reuse", ISCA '07, 1997, 12 pages.*
Oberman et al., "On Division and Reciprocal Caches", Technical Report: CSL-TR-95-666, Apr. 1995, 21 pages.*
Molina et al., "Dynamic Removal of Redundant Computations", 1999, 8 pages.*
Search Report for GB1414439.8 dated Feb. 16, 2015, three pages.
Search Report for GB1414438.0 dated Feb. 16, 2015, three pages.
Search Report for GB1414436.4 dated Jan. 28, 2015, four pages.
Abbas et al., "Temporal Memoization for Energy-Efficient Timing Error Recovery in GPGPUs", *EDAA*, 2014, seven pages.
Office Action dated Mar. 10, 2017 in co-pending U.S. Appl. No. 14/663,831, 24 pages.
Office Action dated Mar. 23, 2017 in co-pending U.S. Appl. No. 14/664,241, 36 pages.
U.S. Appl. No. 14/663,831, filed Mar. 20, 2015, Sideris et al.
U.S. Appl. No. 14/664,241, filed Mar. 20, 2015, Sideris et al.
A. Abddollahi et al, "Precomputation-based Guarding for Dynamic and Leakage Power Reduction" Proceedings of the $21^{st}$ International Conference on Computer Design, 2003, Oct. 2003, 8 pages.
D. Citron et al, "Accelerating Multi-Media Processing by Implementing Memoing in Multiplication and Division Units" Proceedings of the Eight International Conference on Architectural Support for Programming Languages and Operating Systems, Oct. 1998, 10 pages.
J. Gonzalez et al, "Thread Fusion" *ISLPED '08*, ACM/IEEE International Symposium on Low Power Electronics and Design, Aug. 2008, pp. 363-368.
S.E. Richardson, "Exploiting Trivial and Redundant Computation" IEEE 1993, $11^{th}$ Symposium on Computer Arithmetic, Jun. 1993, pp. 220-227.
D. Citron et al, "Hardware Memoization of Mathematical and Trigonometric Functions" Mar. 26, 2000, pp. 1-31.
M. Azam et al, "Low Power Data Processing by Elimination of Redundant Computations" Proceedings of the 1997 International Symposium on Low Power Electronis and Design, Aug. 1997, pp. 259-264.
J. Wang et al, "Pesticide: Using SMT to Improve Performance of Pointer-Bug Detection" International Conference on Computer Design, ICCD 2006, Oct. 2006, 8 pages.
A. Gellert et al, "Energy-Performance Design Space Exploration in SMT Architectures Exploiting Selective Load Value Predictions" Design, Automation & Test in Europe Conference & Exhibition (DATE), Mar. 2010, 4 pages.
A. Gonzalez et al, "Trace-Level Reuse" Proceedings of the 1999 International Conference on Parallel Processing, Sep. 1999, 8 pages.
A. Rahimi et al, "Spatial Memoization: Concurrent Instruction Reuse to Correct Timing Errors in SIMD Architectures" IEEE Transactions on Circuits and Systems—II: Express Briefs, Oct. 2013, pp. 1-5.
Y. Kamiya et al, "A Speculative Technique for Auto-Memoization Processor with Multithreading" 2009 International Conference on Parallel and Distributed Computing, Applications and Technologies, IEEE Dec. 2009, pp. 160-166.
M. Billeter et al, "Efficient Stream Compaction on Wide SIMD Many-Core Architectures" Proceedings of the Conference on High Performance Graphics 2009, Aug. 2009, 8 pages.
G. Long et al, "Minimal Multi-Threading: Finding and Removing Redundant Instructions in Multi-Threaded Processors" MICRO '43 Proceedings of the 2010 $43^{rd}$ Annual IEEE/ACM International Symposium on Microarchitecture, Dec. 2010, 12 pages.
Final Office Action dated Aug. 15, 2017 in co-pending U.S. Appl. No. 14/664,241, 9 pages.

* cited by examiner

| Cycle | S0 | | S1 | | | | | S2 | | | | | S3 | | Table entry 0 | | | Table entry 1 | | |
|---|---|---|---|---|---|---|---|---|---|---|---|---|---|---|---|---|---|---|---|---|
| | en | uop | en | uop | hit | lineno | upd | en | uop | hit | lineno | upd | valid' | outp | uop | result | lock_cnt | uop | result | lock_cnt |
| 0 | 1 | MUL 4,9 (A) | 0 | - | - | - | - | 0 | - | - | - | - | 0 | - | - | - | - | - | - | - |
| 1 | 1 | MUL 4,9 (B) | 1 | MUL 4,9 (A) | 0 | 0 | 1 | 0 | - | - | - | - | 0 | - | MUL 4,9 | - | 0 | - | - | - |
| 2 | 1 | MUL 4,9 (C) | 1 | MUL 4,9 (B) | 1 | 0 | 0 | 1 | MUL 4,9 (A) | 0 | 0 | 1 | 0 | - | MUL 4,9 | - | 1 | - | - | - |
| 3 | 1 | MUL 3,7 | 1 | MUL 4,9 (C) | 1 | 0 | 0 | 0 | MUL 4,9 (B) | 1 | 0 | 0 | 1 | 36 | MUL 4,9 | - | 2 | - | - | - |
| 4 | 1 | MUL 3,9 | 1 | MUL 3,7 | 0 | - | 1 | 1 | MUL 4,9 (C) | 1 | 0 | 0 | 1 | 36 | MUL 4,9 | 36 | 2 | MUL 3,7 | - | 0 |
| 5 | 0 | - | 1 | MUL 3,9 | 0 | - | 1 | 1 | MUL 3,7 | 0 | 1 | 1 | 1 | 36 | MUL 4,9 | 36 | 1 | MUL 3,9 | - | 0 |
| 6 | 1 | MUL 4,6 | 0 | - | - | - | - | 1 | MUL 3,9 | 0 | 1 | - | 1 | 21 | MUL 4,9 | 36 | 0 | MUL 3,9 | - | 0 |
| 7 | 0 | - | 1 | MUL 4,6 | 0 | - | 1 | 0 | - | - | - | - | 1 | 27 | MUL 4,6 | - | 0 | MUL 3,9 | 21 | 0 |
| 8 | 0 | - | 0 | - | - | - | - | 1 | MUL 4,6 | 0 | - | 1 | 0 | - | MUL 4,6 | - | 0 | MUL 3,9 | 27 | 0 |
| 9 | 0 | - | 0 | - | - | - | - | 0 | - | - | - | - | 1 | 24 | MUL 4,6 | - | 0 | MUL 3,9 | 27 | 0 |
| 10 | 0 | - | 0 | - | - | - | - | 0 | - | - | - | - | 0 | - | MUL 4,6 | 24 | 0 | MUL 3,9 | 27 | 0 |

FIG. 4

SUB 17-6           ADD 17 + 2s complement (6)

17 = 00010001                    17 = 00010001
 6 = 00000110 -   ⟶   2s complement (6) = 11111010 +
———————                        ———————
11 = 00001011              (1)   00001011 = 11

| operation | result |
|---|---|
| multiply, inp_a or inp_b = 0 | 0 |
| multiply, inp_a or inp_b = 1 | other of inp_a and inp_b |
| add inp_a or inp_b = 0 | other of inp_a and inp_b |
| add inp_a or inp_b = 1 | increment other of inp_a and inp_b |
| multiply / divide inp_b = $2^n$ | left / right shift inp_a by n places, or increment / decrement exponent of floating point value |

PREVENTING DUPLICATE EXECUTION BY SHARING A RESULT BETWEEN DIFFERENT PROCESSING LANES ASSIGNED MICRO-OPERATIONS THAT GENERATE THE SAME RESULT

This application claims priority to GR Patent Application No. 20140100223 filed 17 Apr. 2014 and GB Patent Application No. 1414436.4, the entire contents of each of which are hereby incorporated by reference.

BACKGROUND

The present technique relates to the field of data processing. More particularly, the technique relates to data processing apparatuses having multiple processing lanes for performing data processing.

A processing apparatus may have two or more processing lanes for performing data processing operations. The present technique seeks to improve the performance and/or reduce energy consumption of this type of apparatus.

SUMMARY

Viewed from one aspect, the present technique provides a data processing apparatus comprising:

first and second processing lanes configured to perform data processing operations in parallel in response to micro-operations; and control circuitry configured to detect whether a first micro-operation to be processed by the first processing lane would give the same result as a second micro-operation processed by the second processing lane;

wherein if the control circuitry detects that the first micro-operation would give the same result as the second micro-operation, then the control circuitry is configured to prevent the first micro-operation being processed by the first processing lane and to control the first processing lane to output the result of the second micro-operation as the result of the first micro-operation.

Viewed from another aspect, the present technique provides a data processing apparatus comprising:

first and second processing lane means for performing data processing operations in parallel in response to micro-operations; and control means for detecting whether a first micro-operation to be processed by the first processing lane means would give the same result as a second micro-operation processed by the second processing lane means;

wherein if the control means detects that the first micro-operation would give the same result as the second micro-operation, then the control means is configured to prevent the first micro-operation being processed by the first processing lane means and to control the first processing lane means to output the result of the second micro-operation as the result of the first micro-operation.

Viewed from a further aspect, the present technique provides a data processing method for a data processing apparatus comprising first and second processing lanes configured to perform data processing operations in parallel in response to micro-operations; the method comprising:

detecting whether a first micro-operation to be processed by the first processing lane would give the same result as a second micro-operation processed by the second processing lane; and if it is detected that the first micro-operation would give the same result as the second micro-operation, preventing the first micro-operation being processed by the first processing lane and controlling the first processing lane to output the result of the second micro-operation as the result of the first micro-operation.

The above, and other objects, features and advantages will be apparent from the following detailed description of illustrative embodiments which is to be read in connection with the accompanying drawings.

BRIEF DESCRIPTION OF THE DRAWINGS

FIG. 4 is a table showing an example of reuse of results of micro-operations using the memoization table;

DESCRIPTION OF EXAMPLE EMBODIMENTS

Figure 1:
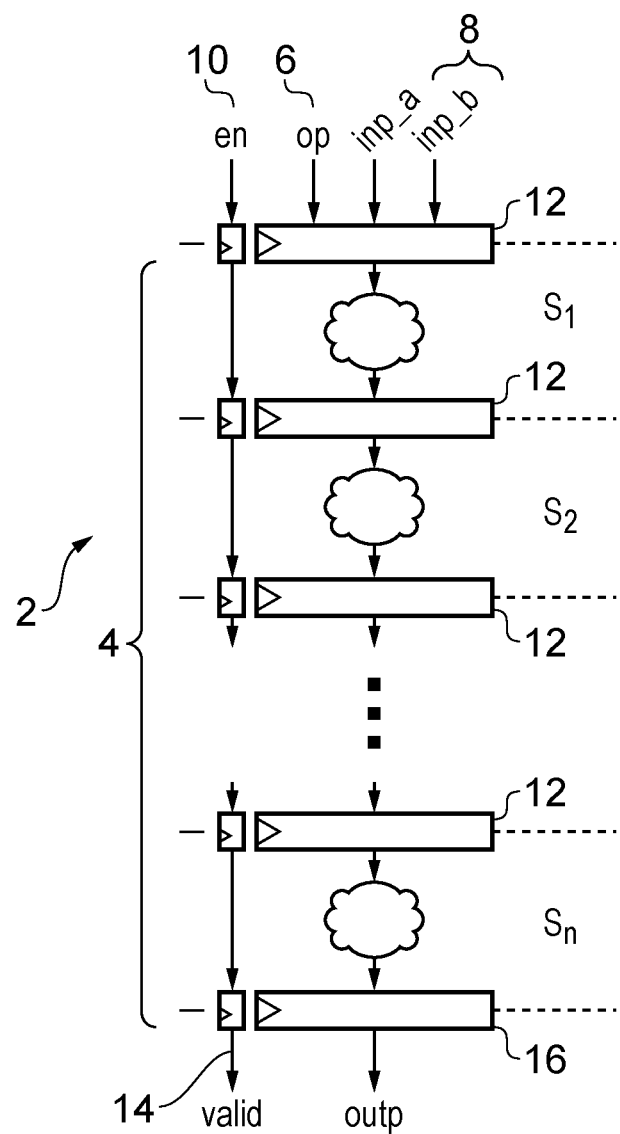
FIG. 1 schematically illustrates a processing pipeline.

The present technique recognises that in data processing apparatuses having multiple lanes for performing data processing in parallel, there is a reasonable probability that the operation performed by one of the lanes will give the same result as the operation performed by another lane. Therefore, control circuitry is provided to detect whether a first micro-operation to be processed by a first processing lane would give the same result as a second micro-operation processed by the second processing lane. If so, the control circuitry prevents the first micro-operation being processed by the first processing lane and controls the first processing lane to output the result of the second micro-operation as the result of the first micro-operation. By sharing processing results between lanes and preventing a micro-operation being processed if its result is available from the other lane, performance can be improved or power consumption can be reduced.

A result path may provide the result of the second micro-operation generated by the second processing lane to an output of the first processing lane. A selector or multiplexer in the first processing lane may select (i) the result produced by the first processing lane in response to a micro-operation which does not give the same result as a micro-operation processed by the second processing lane, or (ii) the result sent via the result path if the result can be reused from the second processing lane, and then output the selected result.

The determination of whether the first micro-operation would give the same result as the second micro-operation need not be an exact determination. The control circuitry may make an estimate of whether the result of the first micro-operation is likely to be the same as the result of the second micro-operation. The estimate may err on the side of caution in detecting that the results will be the same—if unsure it is better to assume that the results will not be the same so that the micro-operation is processed correctly by the first processing lane.

For example, the control circuitry may detect that the results will be the same if the first and second micro-operations are identical, that is, they are for the same data processing operation and specify the same operands. Some processing pipelines may only process micro-operations for performing a single type of data processing operation. In this case, it may be implicit that all micro-operations passed to that pipeline will relate to the same data processing operation, and so no explicit comparison of the data processing operations (e.g. opcodes) associated with different micro-operations may be required. On the other hand, for other pipelines that have functional units corresponding to different data processing operations, to determine whether the first and second micro-operations are the same it may also be necessary to compare an operation identifier of the respective micro-operations. The operation identifier indicates the data processing operation to be performed in response to each micro-operation. For example, the operation identifier may be at least part of an opcode or function select code.

The control circuitry may also detect that the results of the first and second micro-operations would be the same if one of the first and second micro-operations can be converted or translated into the other. For example, a subtract operation may be translated into an equivalent add operation by flipping a sign bit of one of the operands, or by converting one of its operands into its twos complement and then adding the converted operand to the other operand. Also, a multiply or divide micro-operation for multiplying or dividing an operand by a power of 2 (corresponding to $2^N$) may be equivalent to a shift micro-operation for shifting the operand to the left or right by N places (for fixed point arithmetic), or to an operation for incrementing/decrementing the exponent value (for floating point arithmetic), to give the same result. Therefore, to increase the number of times that the power saving can be achieved, the control circuitry may detect when the first micro-operation gives the same result as a different, but equivalent, second micro-operation, and if so then use the result of the second micro-operation generated by the second processing lane for outputting from the first processing lane for the first micro-operation.

Also, some non-identical micro-operations may give the same result. For example, multiply micro-operations for which one of the operands is zero will always give a result of zero, even if the other operand is different. Therefore, the control circuitry may detect that multiply micro-operations give the same result if one of the operands of each micro-operation is zero.

In some embodiments, power consumption can be reduced by reusing the result of the second micro-operation for the first micro-operation. The control circuitry may prevent the first processing lane processing the first micro-operation by placing at least part of the first processing lane in a power saving state during a processing cycle when it would otherwise be processing the first micro-operation. Hence, even if the first micro-operation gives the same result as the second micro-operation, it can still be passed to the processing circuitry of the first processing lane, but parts of the first processing lane may be placed in a power saving state so that they do not actually process the micro-operation in order to save power. This avoids duplication of processing which might occur if both the first and second processing lanes process the same micro-operation.

For example, a clock signal for at least one component (e.g. an input register to one or more pipeline stages, or a processing circuit) within the first processing lane may be clock gated during the processing cycle when that component would otherwise be processing the first micro-operation. By gating the clock signal to components of the first processing lane, it can be prevented from generating a result, and elements of the first processing lane will not switch state, reducing dynamic power consumption.

In some examples the first processing lane may comprise a processing pipeline having multiple pipeline stages. To save power, if the first micro-operation gives the same result as the second micro-operation then the first micro-operation can be passed to the pipeline and each pipeline stage which is traversed by the first micro-operation may be placed in a power saving state during a processing cycle in which the first micro-operation is at that pipeline stage. This approach helps to reduce power while providing an efficient mechanism for controlling the outputting of the result of the second micro-operation as the result of the first micro-operation. As the first micro-operation is still passing through pipeline in the usual way, except that pipeline stages are placed in a power saving state (e.g. by clock gating), the passage of the micro-operation through the pipeline can trigger the result of the second micro-operation to be output for the first micro-operation at the appropriate time.

In some cases, an enable signal may already be provided for indicating to each pipeline stage whether the micro-operation at that pipeline stage is a valid micro-operation. In some cycles there may not be a new micro-operation to be processed and so the enable signal may be de-asserted, which then triggers the corresponding pipeline stage to be placed in the power saving state. The enable signal may be reused to control the power saving when the first micro-operation gives the same result as the second micro-operation. If the first and second micro-operations are detected to give the same result, then the enable signal may be set to indicate that the first micro-operation is an invalid micro-operation so that the corresponding pipeline stages of the first processing lane are placed in the power saving state.

Alternatively, when the result of the second micro-operation can be reused for the first micro-operation then the control circuitry may prevent the first micro-operation being passed to the first processing lane at all. This may allow another micro-operation to be processed by the first processing lane earlier than would be the case if the first micro-operation had to be processed, to improve performance. Again, this avoids duplicating processing which would occur if both processing lanes generated the same result.

The second micro-operation may in some cases be the micro-operation which is received for processing by the second processing lane in the same cycle as the first micro-operation is received for processing by the first processing lane. That is, the first and second micro-operations may be operations received by the two lanes in parallel. It is often more likely that the micro-operations processed in parallel will give the same result than operations processed in different cycles. This approach can provide us simple and area efficient way of reusing results between different processing lanes.

In addition, or instead, the second micro-operation may be the last valid micro-operation received for processing by the second processing lane. Hence, even if the first processing lane receives the first micro-operation in a cycle when the second processing lane does not have a corresponding micro-operation to be processed, if the last valid micro-operation processed by the second processing lane will give the same result as the current micro-operation received by the first processing lane, then the result of that last valid micro-operation may still be available at the second processing lane and so can be forwarded to the first processing lane for outputting in response to the first micro-operation.

Also, the second micro-operation may comprise an earlier micro-operation processed by the second processing lane. For example, the apparatus may have a data store for storing results of a number of earner micro-operations, and if so then the result of an earlier micro-operation processed by the second processing lane can be used for a later micro-operation processed by the first processing lane.

There may also be reuse of results between later and earlier micro-operations processed within the same processing lane. For example, the control circuitry may detect whether the first micro-operation would give the same result as an earlier micro-operation processed by the first processing lane, and if so may prevent the first micro-operation being processed by the first processing lane in the same way as discussed above, and control the first processing lane to output the result of the earlier micro-operation as a result of the first micro-operation. Similarly the second processing lane may also provide such reuse of results within the same lane.

For example, a table may be provided with one or more table entries each identifying an earlier micro-operation processed by one of the processing lanes, together with the result of that earlier micro-operation. The control circuitry may perform a first table lookup to detect whether the table stores a corresponding table entry identifying an earlier micro-operation which would give the same result as the first micro-operation to be processed by the first processing lane. If so, then the first micro-operation may be prevented from being processed and the result stored in the corresponding table entry may be output by the first processing lane. Providing a table for storing earlier results enables further power savings or performance improvements by increasing the number of times that it is not necessary to process the current micro-operation because its result is already available.

The table may be shared between the first and second processing lanes (and shared with any other lanes if there are more than two lanes. Hence, both the first processing lane and the second processing lane may update the table with results of micro-operations generated by that lane, and both lanes may include a table lookup to check whether the current micro-operation to be processed by that lane would give the same result as an earlier micro-operation identified in the table. Hence, a second table look up may be performed for the second processing lane in a similar way to the first lookup described above.

If the control circuitry detects that the first micro-operation would give the same result as the micro-operation received for processing by the second processing lane in the same cycle as the first micro-operation is received for processing by the first processing lane, then the control circuitry may omit the first table lookup. Looking up the table incurs an energy cost because a relatively large number of bits may need to be compared against corresponding bits of the current micro-operation. If the operation being performed by the second processing lane gives the same result as the current operation in the first processing lane than it can be more energy efficient to simply forward the result from the second processing lane than to lookup the table, even if the table would have identified a hit.

Filtering circuitry may be provided to detect whether the first micro-operation to be processed by the processing circuitry satisfies at least one predetermined condition. If the predetermined condition is satisfied, then the control circuitry can omit the first table lookup and/or the determination of whether the first and second micro-operations would give the same result. Comparing different micro-operations can be energy intensive since there may be a large number of bits in the operands of the micro-operation to be compared against each other. There may be some types of micro-operations which are more likely to be able to reuse results than others, no if there is a low probability that a particular kind of micro-operation would give the same result as another earlier micro-operation, it can be more efficient to omit the table lookup or comparison between lanes and to pass the operation to the pipeline for processing the usual way. The comparison or table lookup can be reserved only for the types of micro-operation for which memoization is likely to be useful. For example, the filtering may be based on a range of properties of the micro-operations, such as any one or more of the opcode, operand values, address bits, thread identifier, thread group identifier, quad identifier (in the case of a graphics processor which groups threads in sets of four known as "quads") or other data associated with the micro-operation. A relatively small storage structure known as a history buffer may be provided to record properties of a number of recently encountered micro-operations processed by one or both of the first and second processing lanes, and if the current micro-operation received by the first or second processing lane does not have a corresponding property matching one of the properties recorded in the history buffer then the full comparison can be omitted to save energy.

The present technique may be useful for different types of processing apparatus having multiple processing lanes. For example, in some systems the micro-operations received for processing by the first and second processing lanes in the same cycle correspond to instances of the same program instruction identified by a common program counter shared between the first and second processing lanes, with the operands for these micro-operations specified independently for each lane. This type of system may be known as a single-instruction-multi-threading (SIMT) system. This type of system is often useful in graphics processing where a number of pixels of an image need to be processed using a common processing algorithm. In this case, each pixel may be provided with a corresponding thread of execution in which the some program is executed for each thread with independently specified operand values for each thread. Hence, the processing carried out by each processing lane may correspond to a respective thread of the SIMT processing. Due to spatial locality in graphics processing, it is reasonably likely that nearby pixels of the image may have the same appearance and so give the same processing results for a number of threads. Therefore, by reusing the result generated by one lane for a micro-operation processed by another lane, a significant energy saving can be achieved in a SIMT system or performance improved.

Similarly, the present technique may also be applied to a vector processing system in which the first and second processing lanes may perform data processing operations using respective data elements of one or more operands each having a plurality of data elements. The processing of each element (or each set of corresponding elements across several operands) may be assigned to a respective lane of the processing apparatus. This may be useful in systems which perform vector processing of vector operands, or which use SIMD (single instruction, multiple data) or MIMD (multiple instructions, multiple data) techniques in which parallel operations are applied to respective elements of a common set of operands. Again, there is a reasonably high probability that the results generated for different elements within the same operand will be the same, and so by reusing the result from one lane for another lane, power can be saved or performance can be improved.

In general the first and second processing lanes may be any two lanes of a system having at least two lanes. When there are more than two lanes, similar energy savings may be achieved by sharing results between each respective pair of lanes. However, if the number of lanes becomes large then the energy overhead associated with comparing the micro-operation to be processed by one lane against the micro-operations processed by all of the other lanes, and in passing the results of micro-operations between lanes, becomes large. Therefore, it may be more efficient to restrict comparisons between lanes to a given subset of lanes. One approach may be to partition the lanes into at least two subsets, with the first and second processing lanes for which the results are reused corresponding to lanes within the same subset. If the first micro-operation does not give the same result as another micro-operation to be processed by a lane in the same subset, then the first processing lane may process the first micro-operation to generate its result even if the result would be the same as the result obtained for a micro-operation in a lane of a different subset. By limiting comparisons to within subsets of lanes, more efficient overall implementation is possible.

FIG. 1 schematically illustrates a data processing apparatus 2 comprising a processing pipeline 4 for processing micro-operations. Each micro-operation is represented by an operation identifier 6 (e.g. opcode or function select code) indicating the data processing operation to be performed by the pipeline 4 in response to the micro-operation, and one or more operands 8 to be processed in the data processing operation. In pipelines which can only perform one type of data processing operation, the operation identifier 6 may be omitted. An enable signal 10 is provided with each micro-operation to indicate whether the micro-operation is valid. When no valid operation is to be performed, the enable signal clock gates the input register 12 for pipeline stage $s_1$ in the current cycle and propagates through the pipeline to clock gate each stage $s_2$ to $s_n$ in following cycles. When a stage is clock gated, its clock signal is held at a fixed state so that the stage does not process the micro-operation at that stage. The state of the pipeline stage remains the same to reduce dynamic energy consumption. The valid signal 14 at the end of the pipeline corresponds to a delayed value of the enable 10 input at the start of pipeline, and indicates whether there is a new result at the output register 16.

Figure 2:
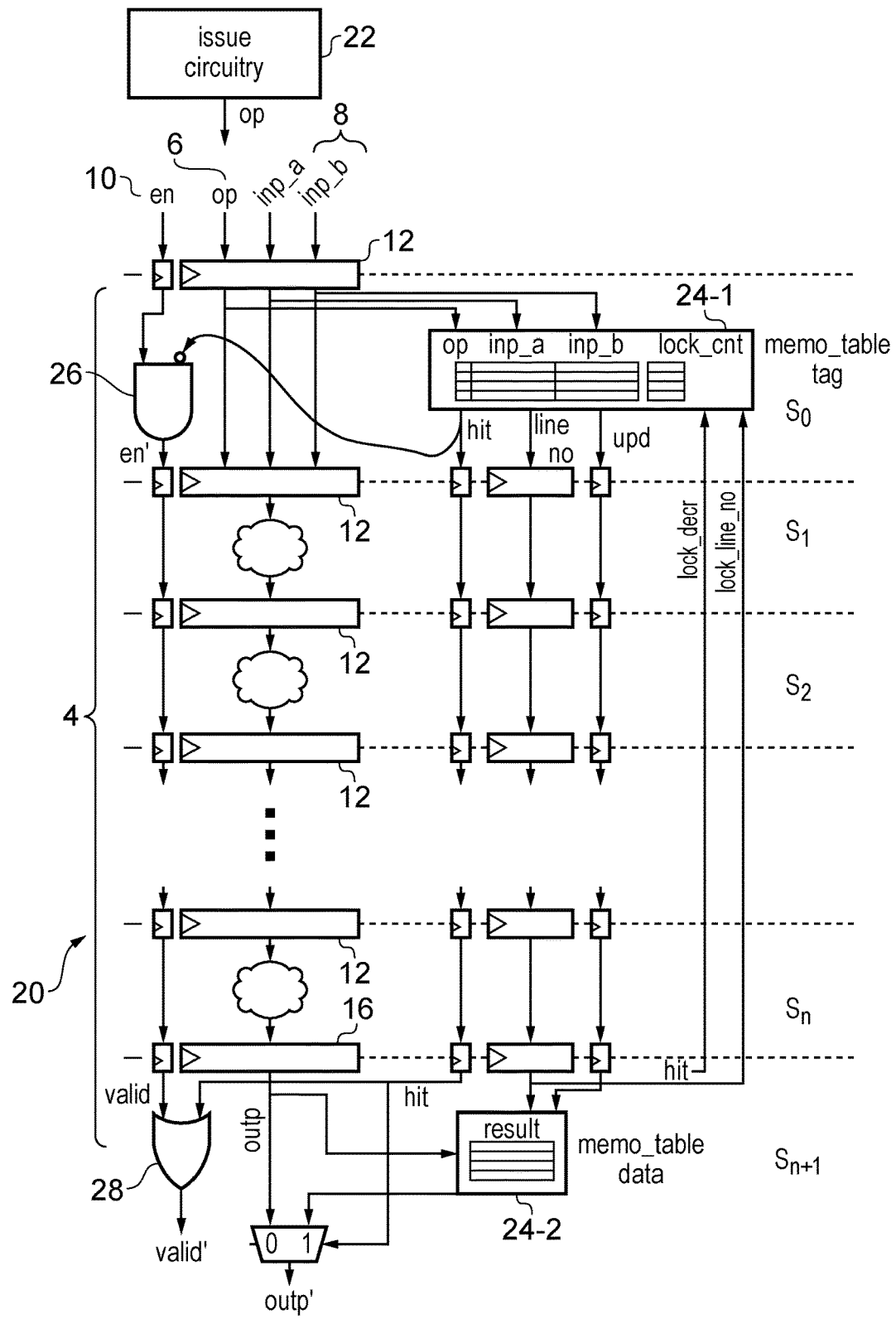
FIG. 2 illustrates an example of a processing pipeline having a memoization table and control circuitry for reusing a result of an earlier micro-operation for a later micro-operation.

FIG. 2 shows a data processing apparatus 20 in which the pipeline 4 is augmented with memoization circuitry for allowing results of an earlier micro-operation to be reused by a later micro-operation. The table 24, AND gate 26, OR gate 28 and additional signal lines added in FIG. 2 compared to FIG. 1 represent control circuitry for controlling the pipeline. Issue circuitry 22 issues micro-operations to the pipeline in a given issue order, and the processing pipeline 4 processes the micro-operations in this order without reordering.

Compared to FIG. 1, an additional stage $s_0$ has been added in the front end of the pipeline of FIG. 2. A memoization table 24 (referred to below as a "memo table" or "table") is provided to store the operation identifier, operands and result of a number of earlier micro-operations processed by the pipeline 4. The table 24 comprises a first data store 24-1 at pipeline stage $s_0$ which stores a tag portion (operation identifier and operands) of each entry and a second data store 24-2 at pipeline stage $s_{n+1}$ which stores a data portion of each entry (comprising the result of the corresponding micro-operation). The table 24 is organized as a fully associative cache, although in another implementation it may be organized as set-associative.

When a new operation is fed into the pipeline 4, the enable signal 10 is 1, and the opcode and the operands are used as a key in the memo table 24 for lookup. If there is a hit, a line number (line_no) identifying the matching table entry is propagated down the pipeline, along with a hit signal (hit=1). In parallel, an AND gate 26 receives the hit signal and sets the enable signal 10 of the ALU (en') to 0, which clock gates the input registers 12 for each pipeline stage to avoid redoing the operation, which saves energy. The enable signal propagates stage by stage and clock gates each stage's input registers. The hit signal of the last stage (delayed version of the initial hit) is ORed with the valid signal at stage $s_{n+1}$ using OR gate 28, to generate the output valid signal (valid'). The line_no value at stage $s_{n+1}$ selects the stored result from the corresponding entry in the second data store 24-2, which drives the output (outp') when the hit signal is 1.

Each table entry in the table 24 has an associated lock counter (lock_cnt) for tracking micro-operations that need that entry which are currently in-flight within the pipeline 4. When a hit is found in the table 24-1 at stage $s_0$, the lock counter for the respective line is increased by 1. At the end stage $s_{n+1}$, whenever the signal hit is 1, a lock decrement signal (lock_decr) is sent back to the first data store 24-1 together with the line number of the entry from which the result is accessed (lock_line_no). In response to the lock decrement signal, the first data store 24-1 decrements the lock counter of the entry indicated by the lock line number (lock_line_no), to flag that the result has been used. The lock counter exists to prevent replacement of a cache line that is going to be used in a later stage of the pipeline.

When the lookup in the memo_table at stage $s_0$ results into a miss (hit=0), the operation is performed as normal and there is no clock gating in the pipeline. The enable signal 10 proceeds down the pipeline as usual and each stage performs its normal processing on the micro-operation. At stage $s_0$, a table entry is selected for writing the result, and the line number (line_no) identifying the selected entry is propagated through a series of registers to control the write at the end stage $s_{n+1}$. A signal upd is also propagated through a series of flip-flops/registers, to indicate that a write of the result of the current micro-operation to the table 24-2 should be performed at stage $s_{n+1}$. When selecting an entry of the table 24 to be allocated to the current micro-operation, if there are free entries in the table 24 then one of these entries is selected. Otherwise, an entry with a lock counter (lock_cnt) equal to zero is selected. A lock counter of 0 means that the line is not used by any instruction in flight in the pipeline 4 and can be safely reallocated (in other examples an initial value other than 0 could be used to indicate an unlocked entry). If all the lines are occupied and have non-zero lock counters, no allocation takes place (and no memoization will be performed for that operation), and the micro-operation may simply proceed down the pipeline as normal. It is also possible to allocate an entry for which the lock counter is 1 and the decrement signal (lock_decr) and lock line number (lock_line_no) indicate that this entry will be unlocked in the current processing cycle.

With the memoization scheme shown in FIG. 2 and described above, re-use of previous processing results can be exploited even for back-to-back identical micro-operations with the same operands. Even if the earlier micro-operation has not generated its result yet by the time the current micro-operation is at stage $s_0$, the earlier micro-operation will already have been allocated a tag entry in the first data store 24-1 and so a hit can be detected, and by the time the current micro-operation reaches stage $s_{n+1}$ the result of the earlier micro-operation will have become available in the second data store 24-2 so that it can be reused for the current micro-operation.

Figure 3:
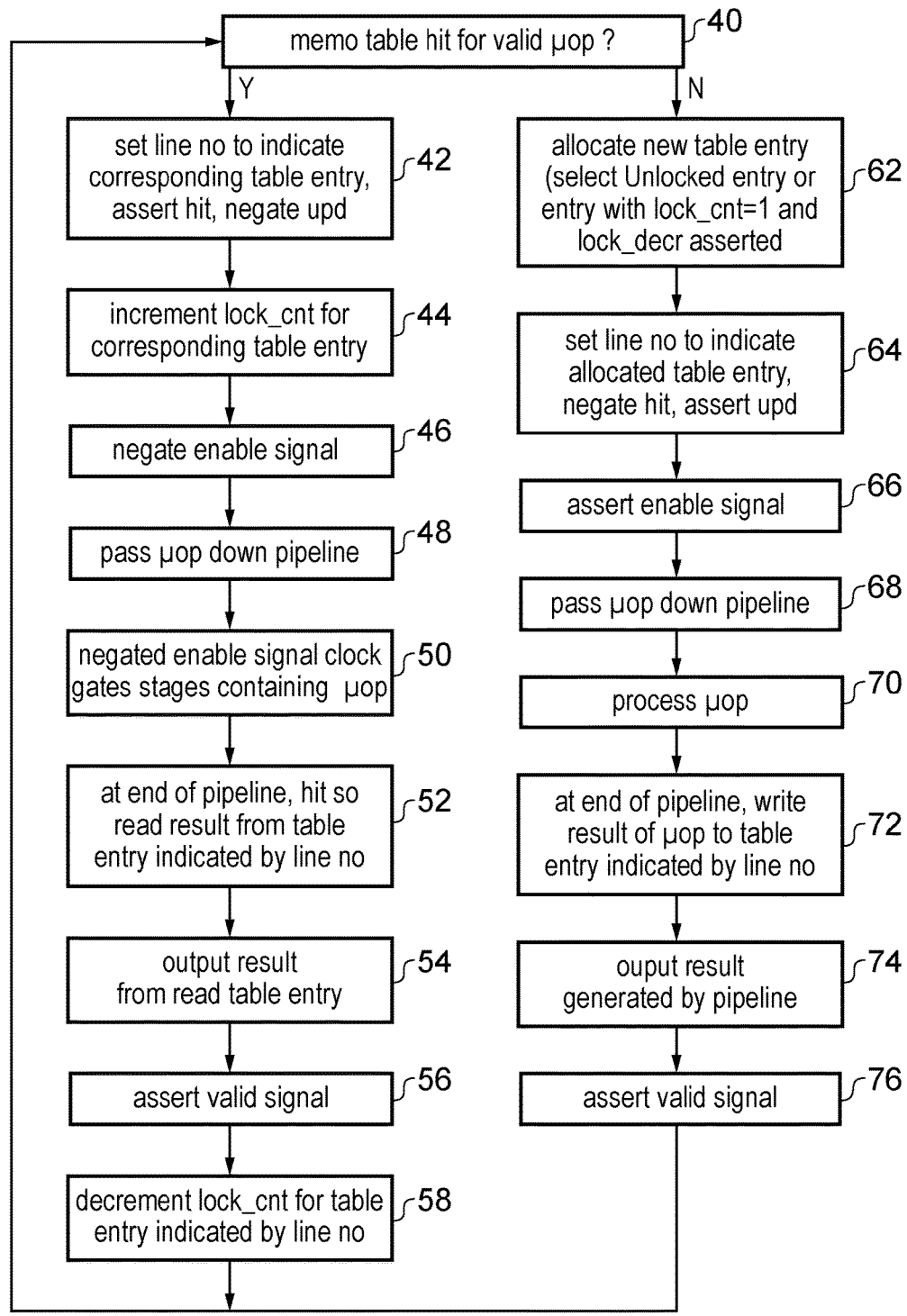
FIG. 3 is a flow diagram illustrating a method of processing micro-operations using the pipeline shown in FIG. 2.

FIG. 3 is a flow diagram showing a method of processing micro-operations using the pipeline of FIG. 2. At step 40 a valid micro-operation is issued to the pipeline 4 and a table lookup is performed using the tag portions in first data store 24-1. The table lookup detects whether there is an entry with the same operation identifier and the same operands as the current micro-operation. If so, then at step 42 the line number is set to identify the table entry corresponding to the current micro-operation, the hit signal is asserted to indicate that there has been a match in the table 24, and the update signal (upd) is negated to indicate that there is no need to update the second data store 24-2 of the table with the result of this micro-operation. At step 44 the lock counter (lock_cnt) for the matching table entry is incremented. At step 46 the asserted hit signal is inverted and applied to one of the inputs of AND gate 26, so that the enable signal 10 for that micro-operation is negated. At step 48 the current micro-operation is passed down the pipeline. At step 50 the negated enable signal clock gates the pipeline stages which are passed by the micro-operation so that these stages will not perform their computation, to reduce power consumption. At step 52 the micro operation reaches the end stage $s_{n+1}$, and the hit signal has been asserted, so this causes the result value to be read from the table entry indicated by the line number (line_no). The result value is output at step 54 and at step 56 the valid signal is output by OR gate 28 because the hit signal was asserted. At step 58 the lock decrement signal (lock_decr) is asserted and the line number of the accessed table entry is output as the lock line number (lock_line_no), causing the lock counter (lock_cnt) to be decremented for that table entry to indicate that this entry is no longer required by the current micro-operation. The method then returns to step 40 for another micro-operation processed in a subsequent clock cycle.

On the other hand, if there is a miss in the memoization table 24 for the current micro-operation, then following step 40 the method proceeds to step 62 where a new table entry is allocated in the table for the current micro-operation. If there is a free (invalid) entry in the table 24 which does not currently store information for a valid micro-operation then this entry can be selected for allocation to the current micro-operation. If there are no free entries then an occupied entry which has its lock counter lock_cnt equal to 0 may be selected. Alternatively, an entry may be selected if its lock counter is equal to 1, the lock line number lock_line_no indicates that entry and the lock decrement signal lock_decr is asserted (indicating that this entry will be unlocked in the current cycle and so will be available by the time the micro-operation reaches the end of the pipeline). At step 64, the line number of the allocated table entry is passed down the pipeline, the hit signal is negated to indicate that there is no match in the table, and the update signal upd is asserted to indicate that when the micro-operation reaches the end of the pipeline then the table should be updated with its result. At step 66, the negated hit signal causes the enable signal to remain asserted. At step 63 the micro-operation proceeds down the pipeline and since its enable signal is still asserted, at step 70 each pipeline stage will process the micro-operation as normal. At step 72 the micro-operation reaches stage $s_{n+1}$. Since the update signal is asserted, the result generated by the pipeline 4 for this micro-operation is written to the second data store 24-2 at the table entry indicated by the line number line_no. At step 74 the result generated by the pipeline is output and the valid signal is again asserted at step 76.

It will be appreciated that in cycles in which there is no valid micro-operation to be processed the enable signal 10, hit signal, update signal upd and valid signal will all be deasserted (negated). Some of the steps of FIG. 3 may be performed in a different order to the order shown in FIG. 3, or in parallel with each other. Also, the processing of each micro-operation is pipelined so that one micro-operation is at one part of the method while another micro-operation is at another part.

FIG. 4 is a table showing an example of micro-operations processed by the pipeline of FIG. 2 and the corresponding entries placed in the table 24 for each micro-operation. For conciseness, this example shows four pipeline stages with stage S0 looking up the table 24, and stage S3 obtaining the result from the table 24. Also, for simplicity it is assumed that the table 24 only has space for two table entries, and that all the micro-operations are multiply micro-operations. It will be appreciated that a greater number of pipeline stages, table entries or types of data processing operation may be provided. Also, while FIG. 4 shows each table entry storing data identifying a micro-operation, its result and a lock counter, in the embodiment of FIG. 2 the data identifying the micro-operation and lock counter may be stored in the tag portion 24-1 of the table while the result is stored in the data portion 24-2 at a later stage in the pipeline. The table entries shown in FIG. 4 show the state of each entry at the start of the corresponding processing cycle (i.e. updates to a table entry do not become effective until the cycle after the update is made). The bracketed letters (A), (B), (C) in FIG. 4 are labels for distinguishing three instances of an identical micro-operation.

In each cycle, the example of FIG. 4 proceeds as follows:

0. MUL 4, 9 (A) (a multiply micro-operation for multiplying operands 4 and 9) is received at stage S0 with enable signal=1. A table lookup is performed, and there is a miss for this micro-operation, so table entry 0 is allocated and the lock counter for this entry initialised to 0. When MUL 4, 9 (A) is sent to stage S1 in the following cycle, its enable signal will be asserted, hit signal deasserted, line number set to identify the allocated entry 0 and the update signal asserted to indicate that the table entry 0 should be updated with the result of this micro-operation.
1. MUL 4, 9 (A) passes to stage S1. Another identical micro-operation MUL 4, 9 (B) is received at stage S0. There is a hit in the table, so there is no need to allocate a table entry. When MUL 4, 9 (B) proceeds to stage S1 in the following cycle, its hit signal will be asserted, causing the enable signal to be deasserted. The line number will identify the table entry 0 for which the hit is detected, and the update signal will be deasserted. Also, the lock counter for entry 0 is incremented to indicate there is now an in-flight micro-operation which needs the result from this entry. Hence, at the start of cycle 2 the entry 0 has a lock counter of 1.
2. MUL 4, 9 (A) passes to stage S2, and MUL 4, 9 (B) passes to stage S1. A third identical micro-operation MUL 4, 9 (C) is received at stage S0 and so this is processed in the same way as MUL 4, 9 (B) in cycle 1. The lock counter for entry 0 is incremented again to a value of 2.
3. The first micro-operation MUL 4, 9 (A) reaches the and of the pipeline at stage S3 and its result 36 is now available and is output with the valid signal asserted. Since the update signal is asserted, the result 36 is written to the table entry 0 indicated by the line number. Meanwhile. MUL 4, 9 (B) and MUL 4, 9 (C) pass to stages S2 and S1 respectively. Also, a different micro-operation MUL 3, 7 is received at stage S0. There is a miss in the table 24 for this micro-operation, and so a free table entry 1 is allocated for this micro-operation, with its lock counter initialised at 0. MUL 3, 7 is passed to stage S1 with its hit signal deasserted, enable signal asserted, line number indicating the allocated entry 1 and update signal asserted.
4. The second micro-operation MUL 4, 9 (B) reaches stage S3. As the hit signal is asserted, its result 36 is read from the table entry 0 indicated by the line number, and is output with the valid signal asserted. The lock counter for entry 0 is decremented to 1. Meanwhile, micro-operations MUL 4, 9 (C) and MUL 3, 7 move to stages S2 and S1 respectively. Also, another different micro-operation MUL 3, 9 is received at stage S0, which again misses in the table and so a new entry is allocated. Since the lock counter for entry 0 is currently 2 (being decremented to 1), entry 0 cannot be allocated for MUL 3, 9, and so entry 1 which has the lock counter at 0 is allocated for MUL 3, 9. In the next cycle. MUL 3, 9 will pass to stage S1 with its hit signal deasserted, update signal asserted, and line number indicating table entry 1.
5. MUL 4, 9 (C) reaches stage S3, and the result from table entry 0 is again reed and output. The lock counter for entry 0 is then decremented from 1 to 0 and so from this cycle entry 0 is available for reallocation as there are no more in-flight micro-operations which require this entry. Meanwhile MUL 3, 7 and MUL 3, 9 pass to stages S2 and S1 respectively. There is no valid micro-operation input to stage S0 in this cycle.
6. MUL 3, 7 reaches stage S3 and its result 21 is available and, as the update signal is asserted, the result is written to table entry 1 as indicated by the line number associated with this micro-operation. Note that the tag portion of table entry 1 has already been updated to identify MUL 3, 9, not MUL 3, 7 for which 21 is the result. However, since the lock counter is 0, there cannot be any micro-operations which will use the result 21 until after the table entry is updated with the result 27 of MUL 3, 9, so correct processing results will still be generated. MUL 3, 9 passes to stage 2. A valid micro-operation MUL 4, 6 is also received at stage S0. There is a miss in the table for this micro-operation, and so a new entry is allocated. Entry 0 is selected because its lock counter is 0, and MUL 4, 6 is passed to stage 1 for the following cycle with the enable signal asserted, hit signal deasserted, line number indicating entry 0 and update signal asserted.
7. No more valid micro-operations are received at stage S0. MUL 3, 9 passes to stage S3 where its result 27 becomes available, and since the update signal is asserted the result is written to the table entry 1 identified by the line number. This overwrites the result 21 previously written to this table entry, so that subsequent operations equivalent to MUL 3, 9 can use this result. MUL 4, 6 passes to stage S1.
8. MUL 4, 6 passes to stage S2.
9. MUL 4, 6 passes to stage 33, where its result 24 is available and is written to table entry 0 so that subsequent micro-operations can use its result if possible.
10. The table entries 0 and 1 are as shown for cycle 10. No more micro-operations have yet been received.

In each processing cycle, pipeline stages with the enable signal set to 0 will be clock gated to save power. Hence, power can be saved since pipeline stage S1 can be clock gated during cycles 2 and 3 when it would normally have to process micro-operations MUL 4, 9 (B) and (C), and similarly stage S2 can be clock gated in cycles 3 and 4 respectively.

As shown in the example of FIG. 4, the approach shown in FIG. 2 allows reuse of identical results even when the corresponding micro-operations are back-to-back in the pipeline and so the result of the first micro-operation is not available when the second micro-operation is encountered. Also, the lock counter stops table entries being overwritten until any in-flight micro-operations requiring that entry have completed. This provides an efficient mechanism for reusing processing results to save power. It has been found that in arithmetic ALUs in graphics pipelines, the probability of re-use of results is about 3-30% for a single entry memo table, or 4-30% for a memo table with two entries (it varies depending on the particular operation being performed by the functional unit). For example, for an interpolation algorithms, some sub-units exhibit even 40% re-use. Hence, significant power savings can be achieved.

FIGS. 2 to 4 show an example in which the control circuitry 24, 26, 28 determines that the current micro-operation would give the same result as an earlier micro-operation if the operation identifier (opcode) and operands (inp_a, inp_b) are the same. It is also possible to determine that the current and earlier micro-operations would give the same result if the current and earlier micro-operations are different, but equivalent, micro-operations. For example, it can be determined that any multiply micro-operation for which one of the operands is zero will be equivalent to any other multiply micro-operation for which one of the operands is zero, even if the other operand is different. Also, the same result may be generated by equivalent add and subtract operations, or by a multiply/divide micro-operation and an equivalent left/right shift. Hence, results of micro-operations may be reused even if the micro-operations are not identical.

Figure 5:
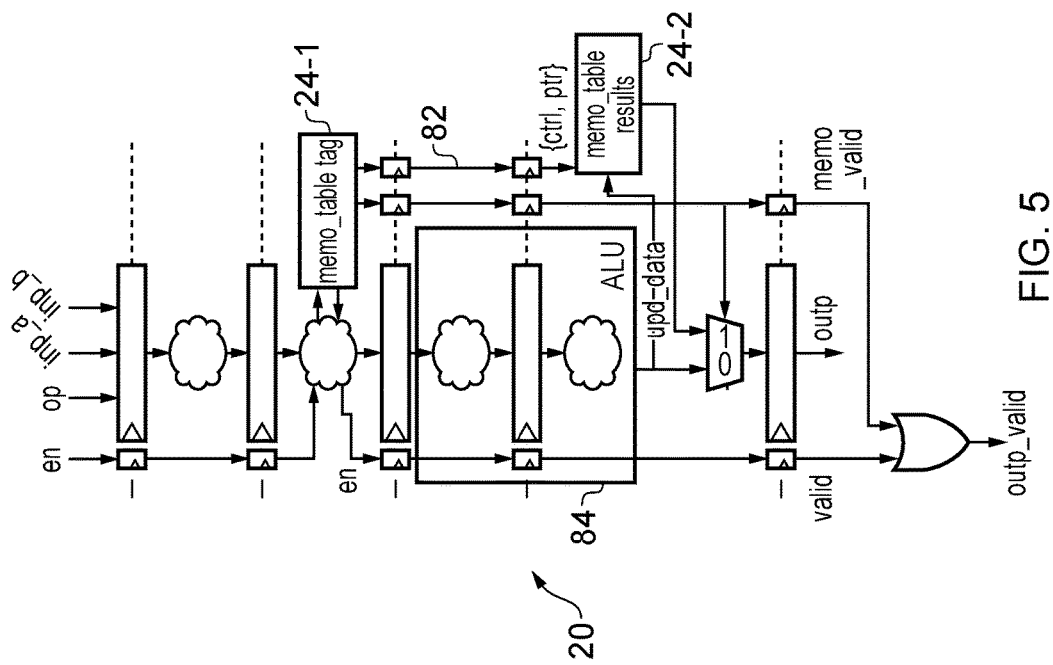
FIG. 5 shows a second example of the pipeline having a memoization table.

FIG. 5 shows a generalised example of the data processing apparatus 20 shown in FIG. 2 (for conciseness the hit signal, line number and update signal are indicated in FIG. 5 as a single control path 82). In the pipeline of FIG. 5, micro-operations are fed to an arithmetic logic unit (ALU) 84, which can potentially be a multi-stage unit. To be able to reuse computation results, the computation results (of all micro-operations or of selected types of micro-operation) are stored in a cache (memo table) having multiple entries, and accessed based on the opcode of the instruction and the operand values (as in FIG. 2). If we have a hit, then we can disable the ALU 84 (e.g. by propagating a clock gate signal) and use the data stored in the memo table 24. This can be done in various ways, but in this example (without loss of generality) we assume that the memo table 24 is distributed with the tag 24-1 in the front end, the data 24-2 in the back end and a pointer (ptr) propagating down the pipeline in case of hit to effectively select the correct result at the output.

Figure 6:
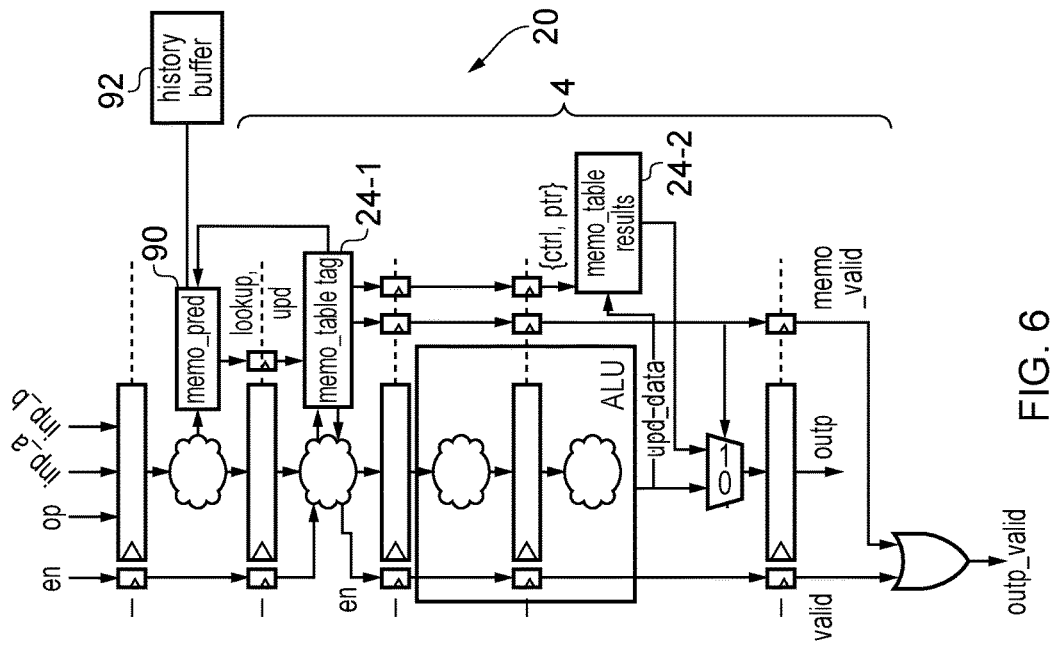
FIG. 6 shows an example of filtering memoization table lookups and filtering updates to the table based on properties of a micro-operation to be processed.

However, accessing potentially multiple entries in the memoization table 24-1 in the front end can be energy consuming, and so can reduce the energy benefits of not performing the computation. If the memoization table 24 is looked up for every micro-operation, this energy penalty would be paid even in cases when the result cannot be reused. FIG. 6 shows an alternative example of the data processing apparatus 20 in which prediction circuitry 90 (also referred to as filtering circuitry) is provided for checking whether the micro-operation received by the pipeline 4 satisfies a predetermined condition, and filtering lookups and updates of the memo table 24 based on whether the condition is satisfied. If the condition is satisfied, this means the micro-operation is of a type for which reuse of results of earlier micro-operations is likely, while if the condition is satisfied then the micro-operation is of a type for which result reuse is unlikely. By restricting accesses to the table to the micro-operations for which result reuse is likely, energy can be conserved.

Hence. FIG. 6 shows the pipeline of FIG. 5 augmented with a prediction unit 90. This unit can be placed a pipeline stage before the memo table lookup. If no operand values are needed for the prediction/filtering, this can be done in parallel with operand fetch (register file access). If an operand is required, then the prediction/filtering must wait until the operands are available.

The filtering can be performed based on some or all bits of an address, a page address, thread ID, thread group ID, opcode, an operand (or multiple operands), or any other data associated with the micro-operations, or a combination of these parameters, for example. For example, the prediction unit 90 may check whether a subset of bits of the operands of the current micro-operation is the same as a corresponding subset of bits in the operands of the micro-operations stored in the memo table 24-1, and then proceed with a full comparison only if these subsets match. This avoids needing to perform the full comparison if the reduced comparison determines that the micro-operations have different operands.

Also, the prediction unit 90 may have a history buffer 92 which provides a separate storage structure to the table 24 for buffering a property of a number of recent earlier micro-operations. The history buffer 92 may be updated in a FIFO (first in first out) or LRU (least recently used) fashion. The property stored in the history buffer 92 may be any of the parameters mentioned above for example. The corresponding property of the current micro-operation may then be compared against the properties stored in the history buffer 92, and the prediction unit 90 may only proceed with the full table lookup 24 if the property of the current micro-operation matches one of the recently encountered properties in the history buffer 92. For example, the probability of reuse of processing results may be much higher for micro-operations having the same thread ID, thread group ID, page address than for micro-operations having different thread IDs, thread group IDs or page addresses, and so by restricting the table lookup to the case where the current micro-operation is from the same thread, thread group or page of memory as a recently encountered micro-operation, a hit in the table is more likely. If the operand values are available, a few bits of the operands can be also compared to increase the prediction rate.

As well as determining whether a table lookup should be performed, the result of the filtering can also determine whether the instruction should update the memo table with a new result. For example, there may be some types of micro-operations for which it is unlikely that its result could be reused for another micro-operation, and so by filtering table updates for such micro-operations, the entries in the table 24 can be saved for micro-operations for which reuse is more likely (the table is not polluted with results which are unlikely to be used again). In a case when it is determined to not perform a lookup, but to update the memo table, an entry in the memo table has to be determined for use. This would require at least some valid/auxiliary information (such as the lock counter) to be accessed from the tag portion 24-1, even when the full comparison is not performed.

One particular example of filtering is in a graphics ALU where micro-operations may each belong to a "quad" of four micro-operations corresponding to a 2×2 group of pixels in an image. The prediction logic 90 may look up whether a thread of the same quad has been seen recently in time, by checking the quad IDs stored in the history buffer 92. The table lookup or table allocation may than proceed only if the quad ID of the current micro-operation matches one of the quad IDs in the history buffer 92. Although the history buffer 92 requires a little additional storage, this prediction may save overall power consumption by reducing the number of lookups to the table 24. Alternatively, a subset of the data stored in the table 24 itself may be used for the prediction (e.g. using an additional read port), so that the history buffer 92 is not essential.

It has been found that filtering based on the instruction type can increase re-use probability from 1-2% to as much as 30% in arithmetic units for single entry memo tables. A large percentage of the instructions having re-use belong to the same quad in graphics ALUs, so by skipping checking the memo table to avoid comparing the operand values if the current micro-operation belongs to a quad that hasn't been seen before in the near history, we can eliminate comparisons of long numbers to save energy.

Figures 7, 8:
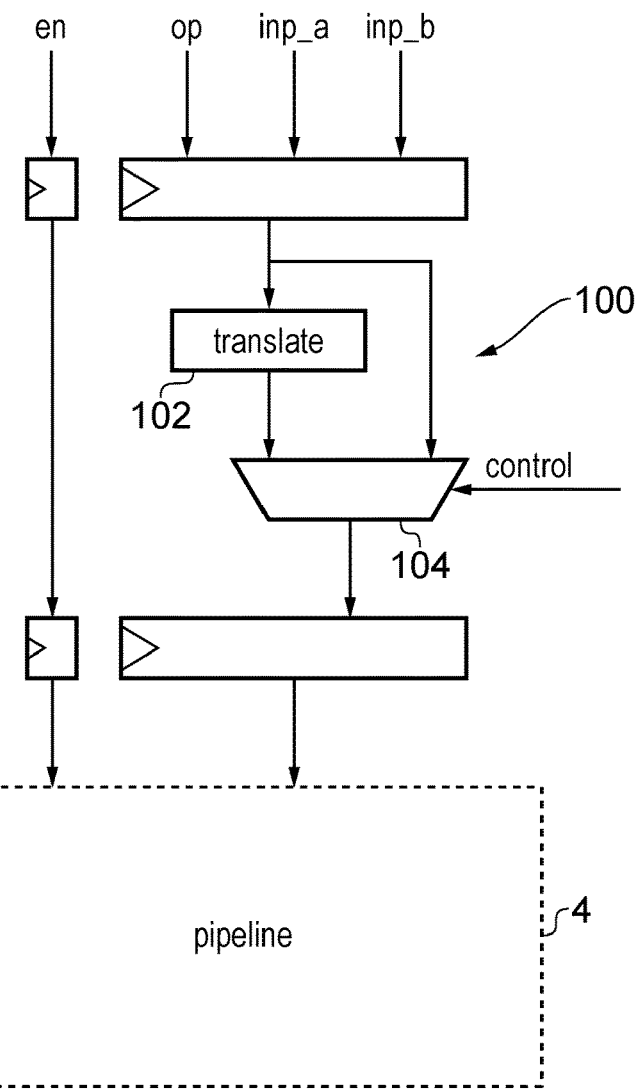
FIG. 7 shows an example of translating a micro-operation into an alternative form.
FIG. 8 shows an example of translation circuitry for translating micro-operations before looking up the memoization table.

As mentioned above, there may be several different micro-operations which produce the same result and so can be mapped to a common form. For example, FIG. 7 shows an example in which a subtract micro-operation can be converted to an equivalent add by generating the twos complement of one of the operands. The conversion between an add operation and subtract operation may alternatively be carried out by changing a sign bit of one of the operands. In other examples, a multiply or divide operation with one of the operands equal to a power of two may be equivalent to a left or right shift (for fixed point arithmetic), or an operation which increments or decrements the exponent by the appropriate amount (for floating point arithmetic). If the different forms of micro-operation giving the same result are passed to the pipeline as is, then these micro-operations may be considered to be different and so two different computations would be performed, each generating the same result, and two separate table entries may be allocated, wasting space for an entry corresponding to a different result. Therefore, as shown in FIG. 8, the pipeline 4 shown in any of the earlier examples may have a preliminary translation stage 100 with translation circuitry 102 for translating micro-operations into an equivalent form that gives the same result. A multiplexer 104 may be controlled to select either the original micro-operation or its translated alternative. The operands of the micro-operation may also need to be translated (e.g. for the example of FIG. 7 one of the operands is replaced with its twos complement). The rest of the pipeline 4 would then function in the same way shown in the examples above. In this way, the number of micro-operations which can reuse the result of an earlier operation can be increased, and the use of multiple table entries for alternative forms of the same operation can be avoided.

Alternatively, it may not be essential for the translation circuitry 102 to actually be provided, but instead circuitry may be provided to ensure that a hit in the table is signalled when the current micro-operation matches an entry corresponding to an equivalent micro-operation giving the same result. However, looking up the table for equivalent but different micro-operations may be tricky, so the translation circuitry may simplify the table lookup.

Figures 9, 10:
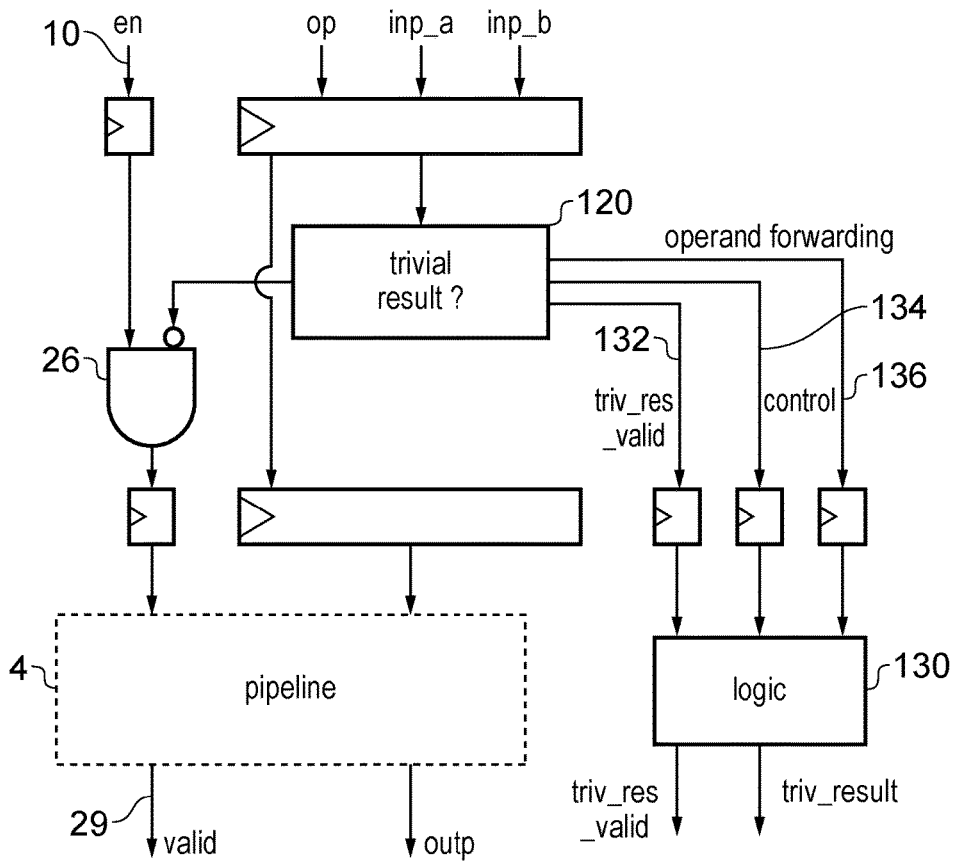
FIG. 9 shows an example of energy saving for micro-operations which give a trivial result.
FIG. 10 is a table showing examples of micro-operations giving a trivial result.

The clock gating mechanism for saving power when results can be reused may also be used to save energy when a micro-operation has a trivial result which can be determined relatively efficiently without using the full pipeline 4. As shown in FIG. 9, an initial pipeline stage may be provided with control circuitry 120 for checking whether the current micro-operation has such a trivial result. FIG. 10 shows some examples of such micro-operations, including:
 a multiply micro-operation where one of the operands is 0 (result will always be 0)
 a multiply operation where one of the operands is 1 (result Will be equal to the other operand)
 an add or subtract operation where one of the operands is 0 (result will be equal to the other operand)
 an add or subtract operation where one of the operands is 1 (result will correspond to an incremented or decremented version of the other operand)
 a multiply or divide operation where one of the operands is a power of 2 (result will correspond to the other operand shifted to the left or right).
There may be many other types of operations for which the result can be obtained relatively efficiently and so to save energy the full pipeline is not required.

Some relatively basic processing logic 130 may be provided which consumes less energy than the main pipeline 4 when generating the result of one of the trivial operations detected by control circuitry 120. If the control circuitry 120 detects that a micro-operation has such a trivial result, then it may control the AND gate 26 to negate the enable signal 10 for the micro-operations so that the pipeline 4 is placed in a power saving state in cycles when the micro-operation traverses each stage, in the same way as shown in FIG. 2 for memoization. A trivial result valid signal 132 may be provided to trigger the processing logic 130 to generate the trivial result and output a valid signal which may then be combined with the normal valid signal 29 from the pipeline to indicate that there is a valid result. If the logic 130 can generate several different trivial results, a control signal 134 may be provided to indicate which result should be generated. An operand forwarding path 136 may also be provided if the trivial result is dependent on one of the operands. While FIG. 9 shows an example where the processing logic 130 is separate from the pipeline 4, in other cases the logic 130 may at least be partially included within the pipeline 4. Also, some of the control signals 132, 134 may be combined with signals from the pipeline. For example, the trivial result valid signal 132 could be overlaid with the hit signal of FIG. 2 to negate the enable signal using AND gate 26. Similarly, the control signal 134 could be conveyed via the line number signal line shown in FIG. 2—i.e. the line number may be used to select the result to be generated by processing logic 130.

Hence, the mechanism provided for clock gating the pipeline when a result of an earlier micro-operation can be reused may also be used to save power when a micro-operation has a trivial result (even if that result is not the same as a result of an earlier micro-operation). This may provide a further power saving. For example, in arithmetic units, it has been found that around 4-16% of multiplications are by 0, so this scheme yields great benefits.

Figure 11:
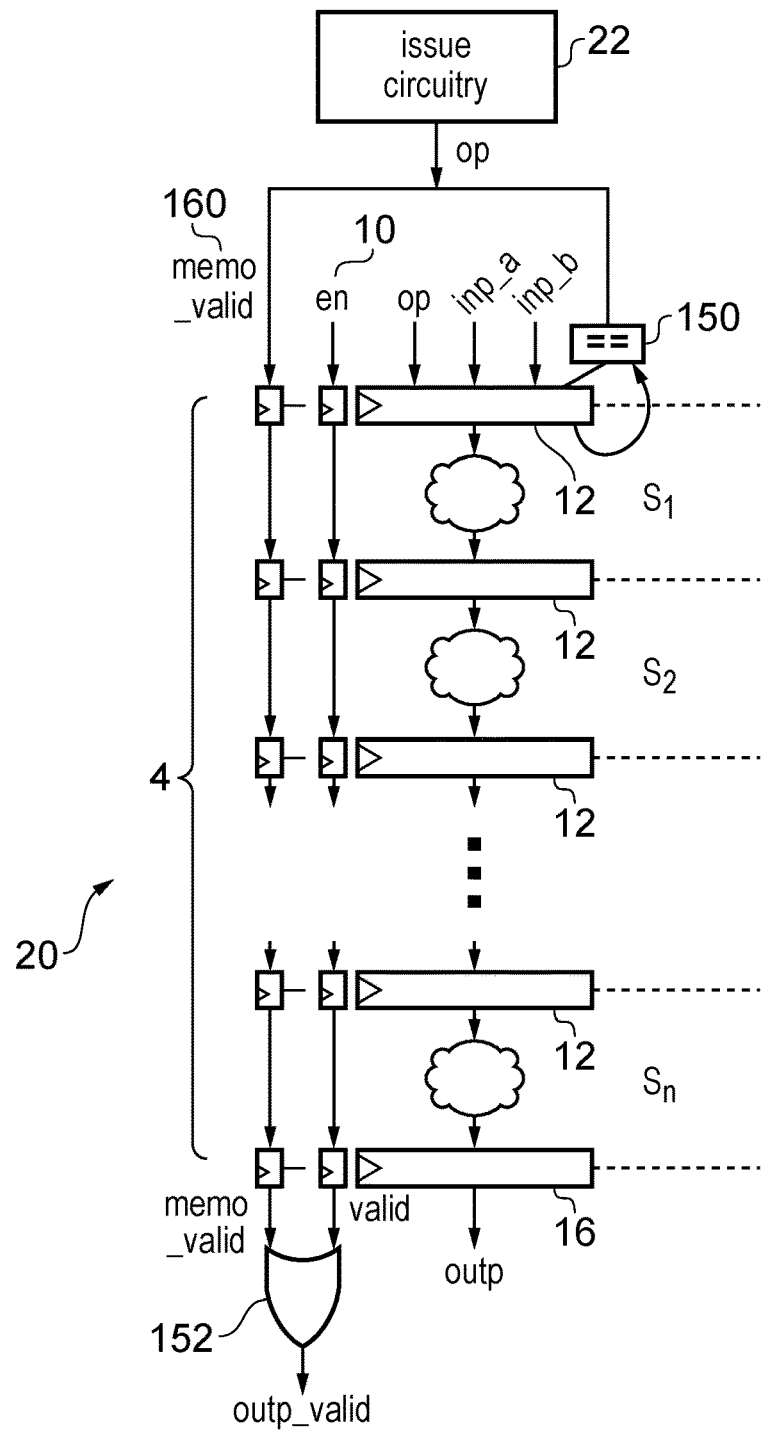
FIG. 11 shows an example of reusing a result of the last valid micro-operation processed by the pipeline for the current micro-operation.

FIG. 11 shows another example for memoizing results of back to back identical computations without any memoization cache or table 24. This can be done by providing comparison circuitry 150 for comparing the input registers 12 of the first pipeline stage S1 with incoming values at the front end of the pipeline 4, and propagating a clock gating signal (deasserted enable signal 10) down the pipeline when the current micro-operation gives the same result as the last valid micro-operation stored in the input register 12. The micro-operation is passed down the pipeline and the deasserted enable signal 10 clock gates each stage passed by the micro-operation to save power. An auxiliary memoization valid (memo valid) signal 160 is propagated cycle by cycle to the next stage, until it reaches the output of the multistage unit and selects the previously computed result for the last valid micro-operation processed by the pipeline 4, which will still be present in the output register 16 because any invalid micro-operations in the meantime would clock gate the output register 16 to prevent it from being updated.

As shown in FIG. 11, this type of memoization can be implemented relatively efficiently since only a little additional circuitry 150, 152 and the memo_valid path 160 need to be added to the pipeline of FIG. 1 (there is no need to maintain and search through a relatively large table).

While FIG. 11 shows an example in which power is saved by gating pipeline stages crossed by a micro-operation if its result is the same as the last valid micro-operation, it is also possible to use this back-to-back memoization technique to improve performance. If the comparison circuitry 150 detects that the result of the current micro-operation will be the same as the last valid result, then the current micro-operation may be prevented from being passed down the pipeline while its result may still be output from the output register 16. Another micro-operation may then be processed earlier than it would have been processed if the current micro-operation was passed down the pipeline, to improve processing speed. Another way of improving performance using memoization may be to collapse bubbles between the last valid micro-operation and the current micro-operation if it gives the same result as the last valid micro-operation— for example the current micro-operation may not need to wait for operand values to become available as a result of earlier micro-operations if it is known that it will give the same result as the last valid micro-operation.

Figure 12:
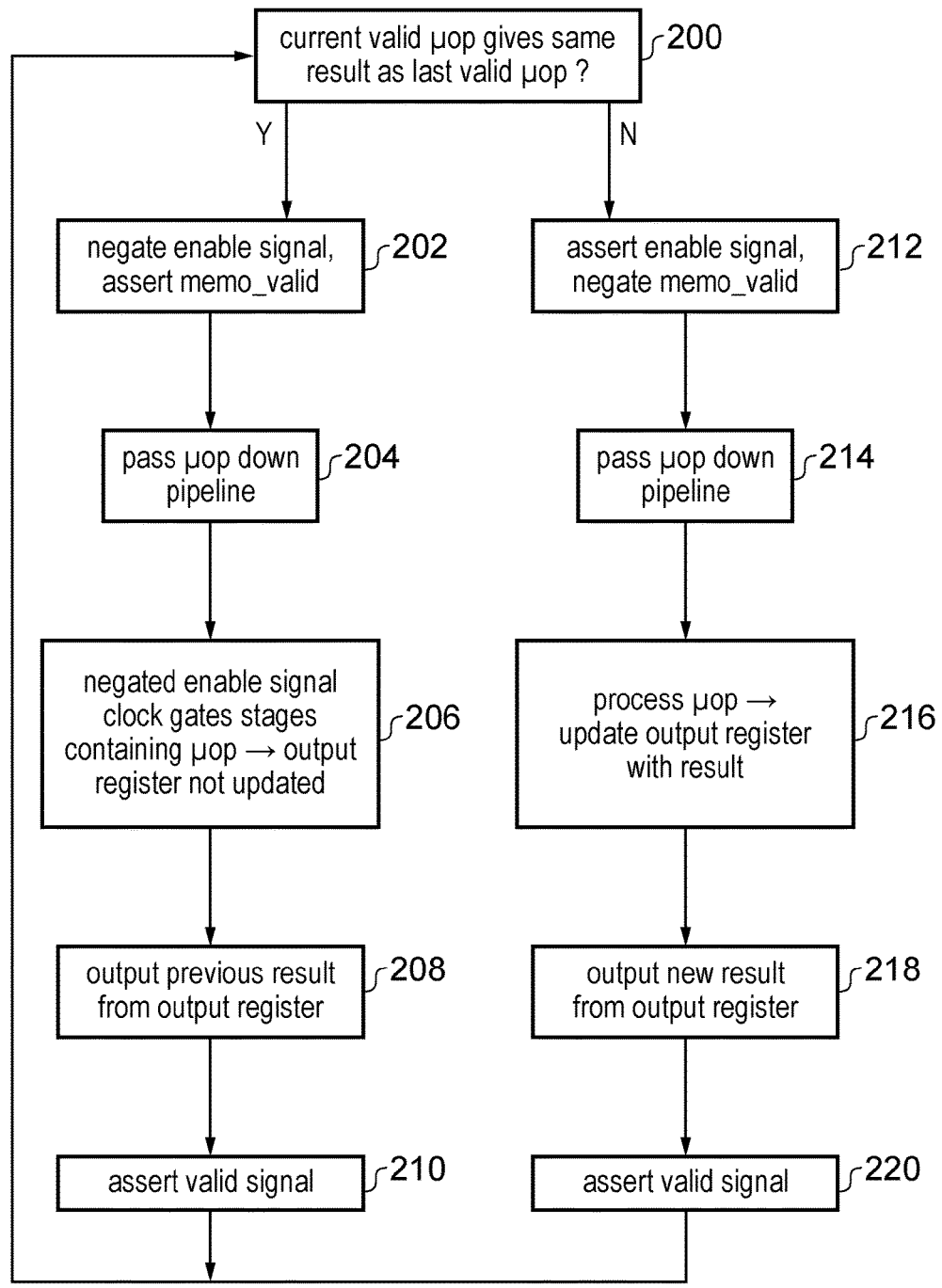
FIG. 12 is a flow diagram showing a method of processing micro-operations with the pipeline of FIG. 11.

FIG. 12 shows a flow diagram illustrating a method of operating the system shown in FIG. 11. At step 200 the comparison circuitry 150 checks whether the current valid micro-operation gives the same result as the last valid micro-operation indicated in the input register 12 of the first pipeline stage $s_1$. If so, than at step 202 the enable signal 10 of the current micro-operation is negated and then the memo valid signal 160 is asserted. At step 204 the current micro-operation is passed down the pipeline, and at step 206 the negated enable signal clock gates each pipeline stage passed by the current micro-operation to save power, so that the output register 16 will not be updated in response to this micro-operation. Therefore, when the micro-operation reaches the end of the pipeline at step 208, the output register still holds the result of the previous valid micro-operation and this can be output as result of the current micro-operation. At step 210 the asserted memo valid signal 160 means that the output valid signal is also asserted by OR gate 152.

On the other hand, if the current micro-operation is not the same as the last valid micro-operation, then at step 212 the enable signal 10 stays asserted and the memo valid signal 160 is negated. The micro-operation is passed to the pipeline at step 214, and processed by the pipeline 4 in the usual way at step 216. Each pipeline stage updates the input register 12 of the next stage according to the result of processing the micro-operation with that stage. When the micro-operation reaches the final stage at step 218, the output register 16 has been updated with the result of the micro-operation and this result is output. At step 220, the output valid signal is asserted by OR gate 152 because the enable signal 10 for this micro-operation was asserted. Again, some of the steps shown in FIG. 12 may be performed in parallel with each other or in a different order, and may be pipelined with steps performed for another micro-operation.

Figure 13:
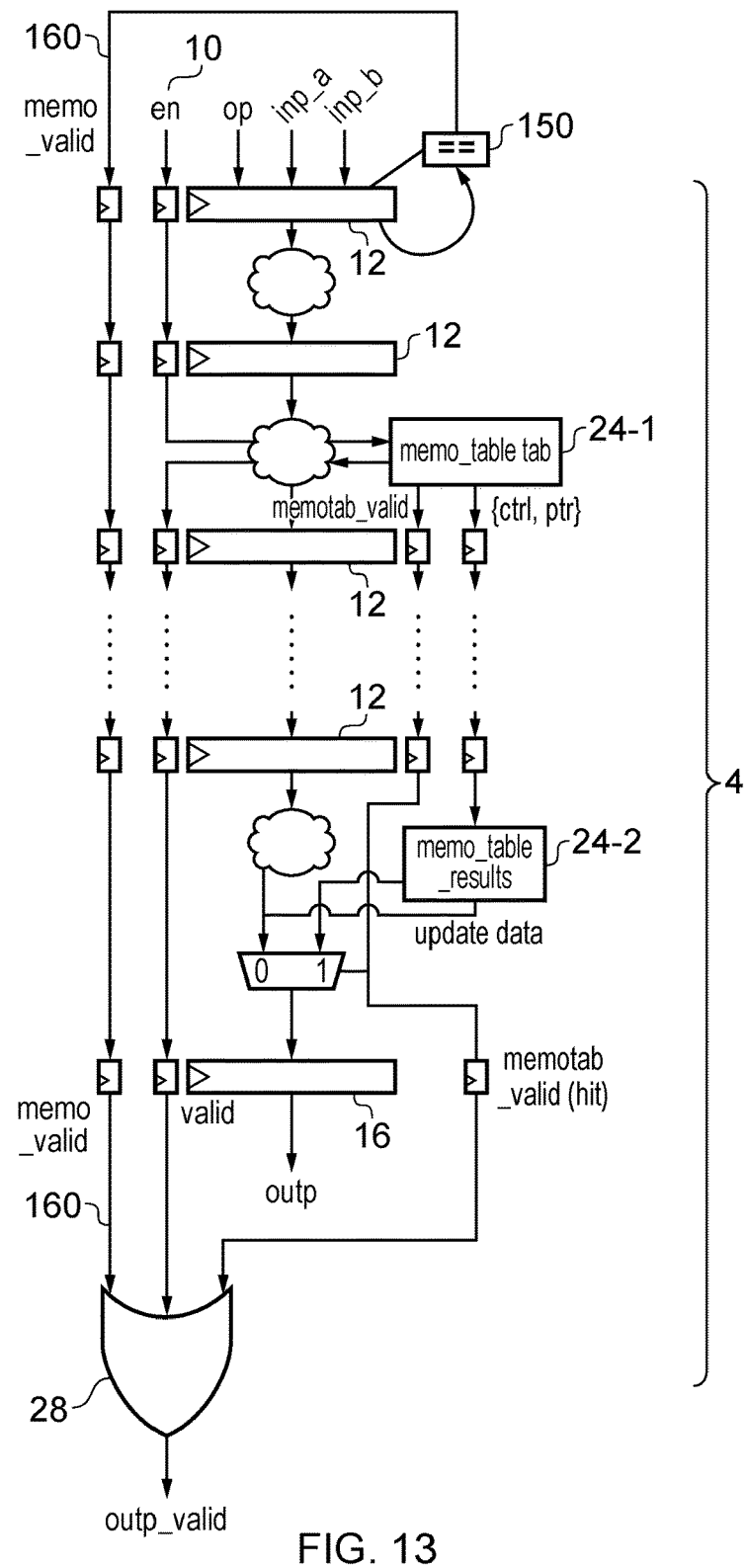
FIG. 13 shows a pipeline having a memoization table in which lookups of the memoization table are omitted when the current micro-operation gives the same result as the last valid micro-operation processed by the pipeline.

As shown in FIG. 13, the memoization of back-to-back identical results as shown in FIG. 11 may also be applied to a pipeline 5 having a memoization table 24 for storing results of earlier micro-operations. FIG. 13 shows a similar pipeline to FIG. 5, but other examples could be based on FIG. 2. The pipeline of FIG. 5 is provided with the comparison logic 150 shown in FIG. 11 for checking whether the current micro-operation gives the same result as the last valid micro-operation. If the current micro-operation gives the same result as the last valid micro-operation, the enable signal is deasserted so that the subsequent pipeline stage will not perform a lookup of the memoization table 24. Instead, the memo_valid signal 160 is asserted and this controls the final pipeline stage to output the value stored in the output register 16 as the output of the current micro-operation. On the other hand, if the comparison logic 150 determines that the current micro-operation will not give the same result as the last valid micro-operation, then the enable signal remains asserted. The next pipeline stage then proceeds with a lookup of the table 24 in the same way as discussed with respect to FIGS. 2-5, to check whether the micro-operation will give the same result as a micro-operation earlier than the last valid micro-operation. The OR gate 28 at the end of the pipeline combines three signals using a logical OR operation to generate the output valid signal: (i) the memo_valid signal 160 (asserted if the micro-operation gives the same result as the last valid micro-operation), (ii) the memo table valid signal (hit signal) asserted if the micro-operation matched an entry in the table and no the result output from the table is a valid result for that micro-operation, and (iii) the enable signal 10 which if asserted indicates that the output of the output register 16 corresponds to a result value generated by the pipeline 4 in the normal way, without memoization. If any of these three signals is asserted, then the output valid signal is also asserted.

In the example of FIG. 13, the back-to-back memoization technique provided by the comparison circuitry 15 and memo_valid path 160 helps to reduce the energy costs of looking up the memoization table 24. If the comparison circuitry 150 does not detect that back to back results are the same, then the table will be looked up to check whether it is possible to reuse an earlier result and clock gate stages of the pipeline to save power. However, when back to back valid micro-operations give the same result, then the output register 16 will effectively memoize the result of the last valid micro-operation, and so the table lookup is not needed. Therefore, energy can be saved by omitting the table lookup in this case. The comparison circuitry 150 in FIG. 13 can effectively be viewed as a kind of filtering circuitry as in the embodiment of FIG. 6 in that it filters out table lookups and table allocations if the current and last valid micro-operations give the same result.

Figure 14A:
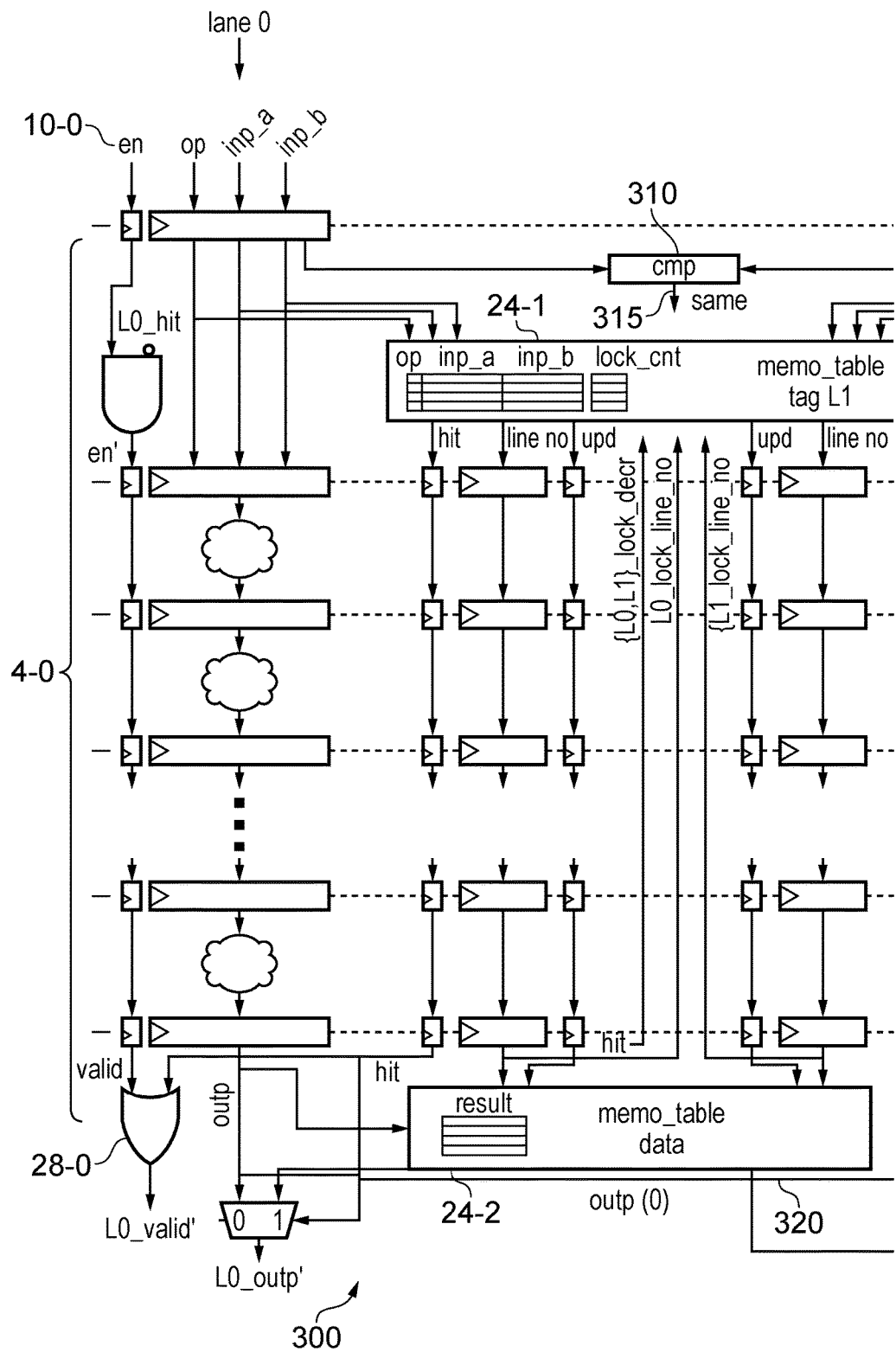
FIGS. 14A and 14B schematically illustrates a data processing apparatus having two processing lanes where results for processing are shared between lanes.
Figure 14B:
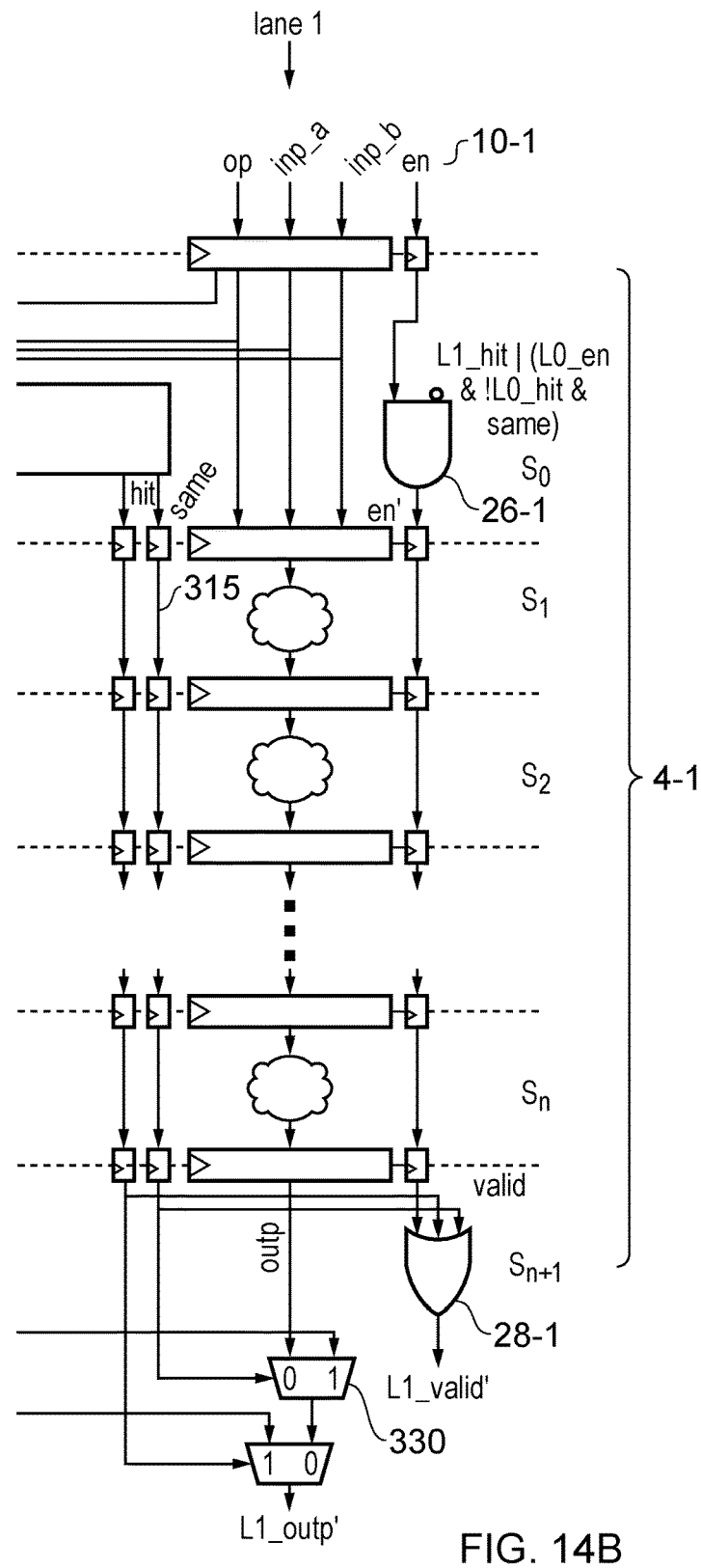

FIGS. 14A and 14B schematically illustrates an example of a data processing apparatus 300 having two processing lanes (referred to as lane 0 and lane 1 respectively lane 1 is also referred to as the "first processing lane" and lane 0 as the "second processing lane"). Each processing lane has a pipeline 4-0, 4-1 for processing micro-operations in parallel with each other. Lane 0 is arranged as shown in FIG. 2. A memoization table 24 is provided with the tag portion 24-1 in the front end of the pipeline at stage $S_0$ and the data portion 24-2 in the final stage $S_{n+1}$ of the pipeline 4-0. Lane 0 operates in the same way as the pipeline of FIG. 2. If there is a hit in the table 24 for the current micro-operation received by lane 0, then the AND gate 26 negates the enable signal 10-0 for lane 0, so that pipeline stages containing that micro-operation are clock gated, and the hit signal is asserted together with the line number of the matching table entry, to trigger the final pipeline stage to select the appropriate result from the data portion 24-2 of the table. The OR gate 28-0 receives the hit signal and the enable signal and outputs a valid signal when either signal is high. As in FIG. 2, there is a lock mechanism for ensuring that entries of the table associated with in-flight micro-operations are not overwritten before they are used.

FIGS. 14A and 14B differs from FIG. 2 in that the memoization table 24 is shared between lanes 0 and 1. Lane 1 interacts with the table in the same way as lane 0. However, both lanes share the same table, so they look up the same entries and the table is updated based on results generated by both lanes 0 and 1. This allows a micro-operation in one of the processing lanes to reuse the result of an earlier micro-operation in the other lane. Each lane can also reuse results generated by earlier micro-operations within the same lane. Both lanes 0, 1 increment/decrement the same lock counters associated with the table entry. Hence, if one lane locks an entry for use by an in-flight micro-operation in that lane, the other lane cannot reallocate that entry for a new micro-operation until the lock is removed.

The apparatus 300 of FIGS. 14A and 14B also has comparison logic 310 for allowing results to be shared between micro-operations processed by the respective processing lanes 0 and 1 in the same cycle. In each cycle, the comparison logic 310 compares the micro-operations input to the respective lanes to see whether they would give the same result (either because the micro-operations are identical or if they can be translated into each other) If the results will be the same then a "same" signal 315 is asserted and this propagates down the pipeline 4-1 of lane 1. If the same signal is asserted, then the AND gate 26-1 of lane 1 clears the enable signal for the current micro-operation, which causes the pipeline stages containing the current micro-operation in lane 1 to be clock gated. The "same" signal 315 propagates down the pipeline together with the corresponding micro-operation. A result path 320 is provided for forwarding the result generated by lane 0 to a multiplexer 330 in lane 1. When the same signal 315 is high, the multiplexer 330 selects the output from the result path 320 and outputs it for lane 1. When the same signal 315 is low then the normal output of the pipeline 4-1 is output by multiplexer 330. Also, the OR gate 28-1 of lane 1 receives as inputs the enable signal 10-1, the hit signal for lane 1, and the same signal 315 generated by comparison logic 310. If any of these signals is high then the lane 1 valid signal is asserted to indicate that the output of this lane is a valid result.

This mechanism allows a result generated by one lane to be reused in the other lane when both lanes are performing (in parallel) a micro-operation which gives the same result. This is very useful because in some systems there is a very high probability that two or more lanes in a data processing apparatus may be processing the same operation at the same time. For example, the apparatus shown in FIG. 14 may be used in a single instruction multiple threading (SIMT) environment in which different threads execute the same program in lock step with each other. A common program counter is used for all the threads, which is incremented for the group of threads as whole. Even if one thread does not need to execute the current instruction indicated by the program counter (e.g. for the current thread, an earlier branch instruction branched past the address indicated by the program counter while other threads did not branch and so still require the current instruction indicated by the program counter), other threads cannot move to the next instruction until the program counter is incremented for the group as a whole. Each thread may run using operands specified separately for each thread. This can be useful for example for graphics processing applications where each pixel of an image needs to be processed using the same set of operations but with different data. In this case, a thread can be allocated to each pixel and different processing lanes may perform the processing for different pixels. It is reasonably likely that neighbouring pixels will share the same operands and so may require the same results. The threads corresponding to neighbouring pixels may be allocated to respective lanes of the processing apparatus 300 and so is likely that different lanes will simultaneously be performing the same operation and so the result of one can be reused by the other to save energy. It has been measured in an ALU comprising two processing lanes that there may be as much as 55% probability that both lanes will be performing the same operation. Also, the probability of result reuse between earlier and later operations within the two lane apparatus was found to be around 40%. Therefore, the combination of the memoization table 24 for sharing results between earlier and later operations (memoization in time) and the comparison logic 310 for sharing results between operations performed at the same time by different lanes (memoization in space) provides great energy savings.

Another application for the apparatus shown in FIGS. 14A and 14B may be where each lane processes respective data elements of an operand having multiple elements (e.g. vector processing, SIMD or MIMD). Again, there is a reasonable probability that several elements within the same operand will have the same data and so results may be reused between lanes.

While not illustrated in FIGS. 14A and 14B, filtering of lookups and/or allocations to the table 24 may be provided as in the example of FIG. 6, by adding a preliminary pipeline stage with prediction logic 90 and a history buffer 92 as in FIG. 6. Also, the apparatus in FIGS. 14A and 14B may be augmented with the trivial result checking logic of FIG. 9 or translation logic of FIG. 8.

In the example of FIGS. 14A and 14B, the memoization table 24 is looked up in parallel with the comparison provided by comparison logic 310 to improve performance. If there is a hit in the table 24 for lane 1, then this causes the pipeline to be clock gated and the enable signal 10-1 will be deasserted irrespective of whether the micro-operations compared by comparison logic 310 would give the same result. However, in other embodiments it may be possible to perform the comparison of the comparison logic 310 in an earlier cycle than the look up to the memoization table 24. In this case, if the comparison logic 310 finds that the micro-operations in the input register for lane 0 and lane 1 give the same result, then the memoization table lookup could be omitted for lane 1 to save energy. If necessary, a second forwarding path may be provided for forwarding the result read from the memoization table 24-2 for lane 0 to the output of lane 1, to allow lane 1 to output the correct result even if the lane 1 table lookup is omitted while lane 0 also does not generate the actual result because it hits in the memoization table 24.

Figure 15:
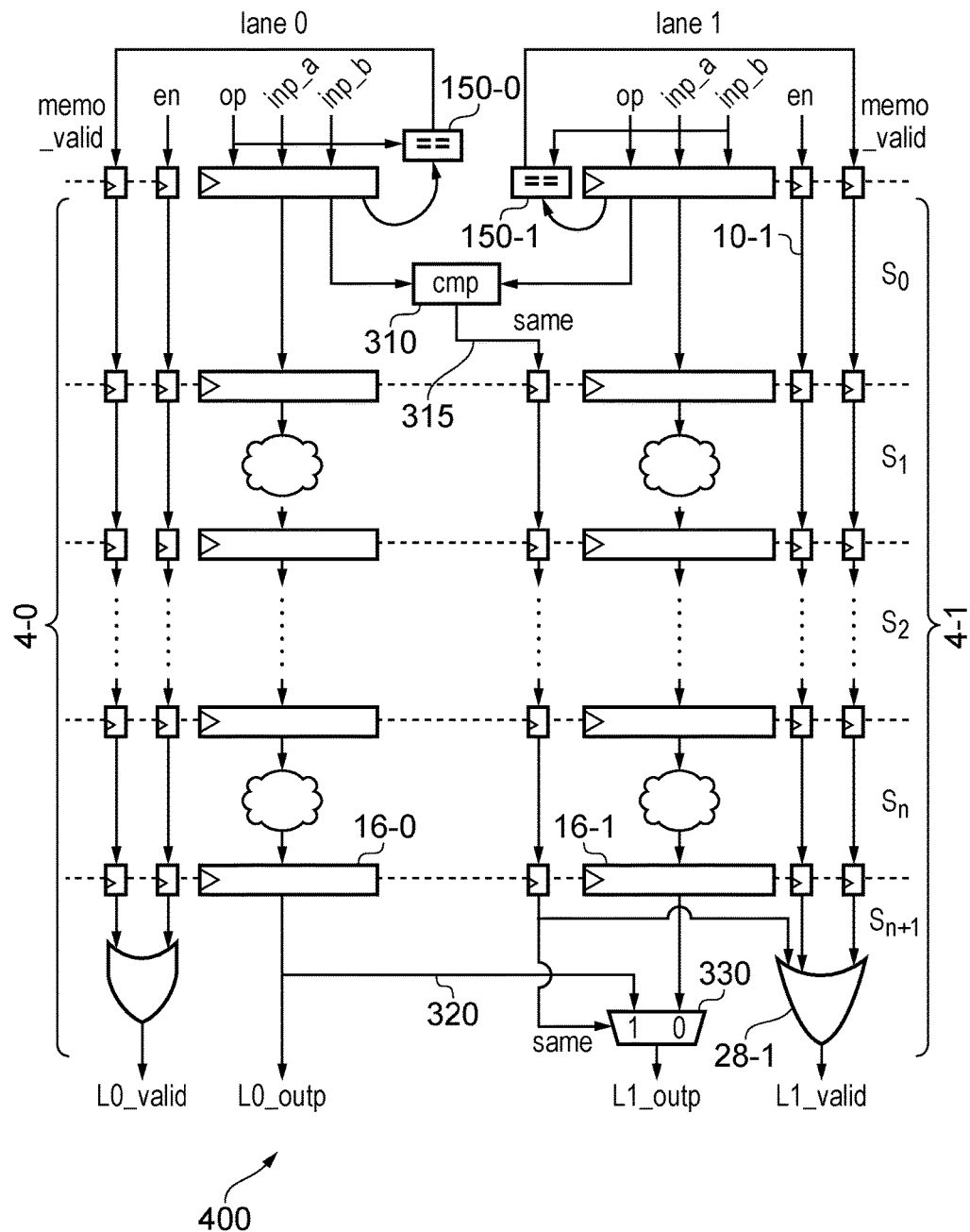
FIG. 15 shows another example of a data processing apparatus having two lanes in which each lane reuses the result of the last valid micro-operation if the next micro-operation gives the same result and results are also shared between lanes.

FIG. 15 shows another example of a data processing apparatus 400 in which there two processing lanes. In this case, each lane has comparison logic 150 as shown in FIGS. 11 and 13 for comparing back to back micro-operations within the same lane to see whether they would give the same result. Each lane functions in the same way as shown in FIG. 11 to clock gate pipeline stages if the micro-operation at that stage would give the same result as the last valid micro-operation processed by that lane, and to output the previous result from the output register 16-0, 16-1 if the memo valid signal is asserted. However, additional comparison logic 310 is provided to compare the micro-operations input to each lane in the same cycle to see whether they would give the same result. If so, then the same signal 315 is asserted and this propagates down the pipeline 4-1 of lane 1 and causes the lane 1 enable signal 10-1 to be deasserted (e.g. using AND gate to deassert the enable signal as shown in FIGS. 14A and 14B, not illustrated in FIG. 15 for conciseness). When the same signal 315 reaches the end of the pipeline of lane 1, this indicates that the result of this micro-operation is available over result path 320 and so multiplexer 330 selects this result. As the same signal is asserted, the OR gate 28-1 asserts the valid signal to indicate that the output result is valid. Otherwise, each lane 0, 1 functions as shown in FIG. 11. Hence, in this example there is memoization in time between back to back operations within the same lane (as in FIG. 11) and also memoization in space between the parallel operations processed by the two lanes (as in FIGS. 14A and 14B).

In both FIGS. 14A/14B and 15, if no valid micro-operation is input to one of the lanes for one or more cycles, then a valid micro-operation received by the other lane will be compared by comparison logic 310 against the last valid micro-operation processed by the other lane, because the input register to each lane will continue to store the last valid micro-operation until a new valid operation is received. Therefore, even if the back to back comparison logic 150 shown in FIG. 15 is not provided, there will still be to some extent a "memoization in time" in FIGS. 14A and 14B—during a cycle in which only one lane contains a valid micro-operation there will be a comparison between the valid micro-operation in one lane and a previous valid micro-operation in the other lane.

Also, it is possible to provide a multi-lane processing apparatus in which each lane is as shown in FIG. 13 having both the memoization table 24 and the back to back comparison logic 150. In addition, comparison logic 310, the forwarding path 320 and the multiplexer 330 may be added in the same way as FIGS. 14A/14B and 15 to allow reuse of results between parallel operations received by the two lanes.

It is also possible for an apparatus to share results only by means of the comparison logic 310, forwarding path 320 and multiplexer 330, without providing either the memoization table 24 or the back to back comparison logic 150.

While FIGS. 14A/14B and 15 show examples where the memoization is applied to achieve energy savings when the operations processed in parallel by different lanes give the same result, it is also possible to use this technique to improve performance by preventing a micro-operation being passed to one lane when its result is available from the other lane, so that another micro-operation can be processed earlier.

Figure 16:
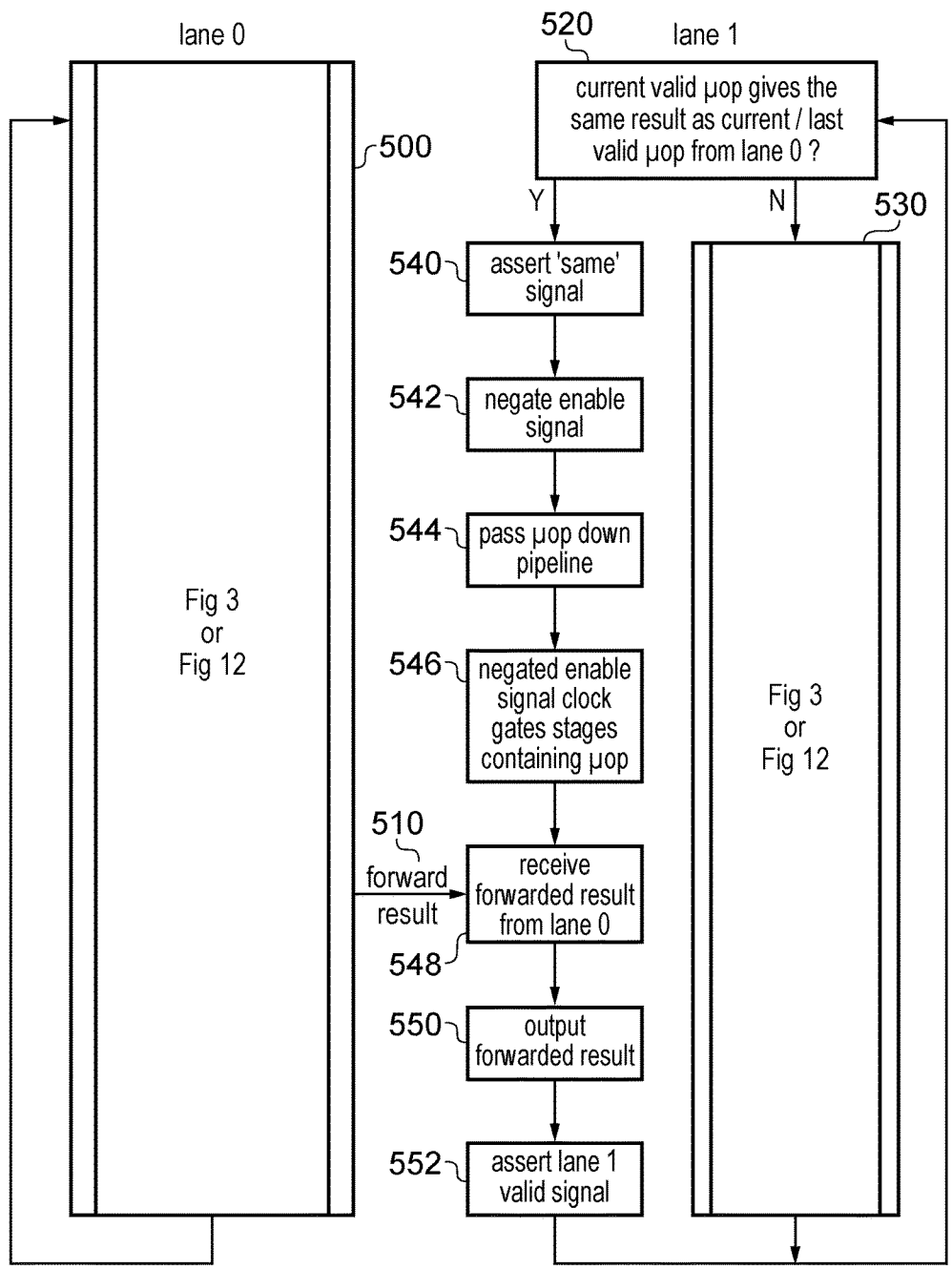
FIG. 16 schematically illustrates a method of processing micro-operations using one of the apparatuses shown in FIGS. 14A and 14B and 15.

FIG. 16 shows a method of processing data using an apparatus having multiple lanes of processing. As shown at step 500, lane 0 processes the micro-operations in the same way as in FIG. 3 (for the embodiment of FIGS. 14A and 14B) or FIG. 12 (for the embodiment of FIG. 15). However, when a result is generated by the pipeline of lane 0 then it is passed to lane 1 at step 510

On the other hand, at step 520 for lane 1 the comparison logic 310 checks whether the current micro-operation received at the input register of lane 1 would give the same result as the current micro-operation or the last valid micro-operation identified in the input register of lane 0. If not, then the method proceeds to step 530 where lane 1 processes the micro-operation in the same way as in FIG. 3 or FIG. 12.

If the current micro-operation in lane 1 would give the same result as the current or last valid micro-operation in lane 0, than at step 540 the same signal 315 is asserted and at step 542 this causes the enable signal 10-1 to be negated for lane 1. The current micro-operation is passed down the pipeline at step 544 and at step 546 the negated enable signal clock gates stages that contain the current micro-operation. At step 548 the micro-operation reaches the end of pipeline and the result generated by lane 0 is received along the result path 320. At step 550 the result from lane 0 is output by lane 1 as a result of current micro-operation. At step 552 the asserted same signal causes the valid signal for lane 1 to be asserted. The method then returns to the beginning to process the next micro-operation of each lane.

Hence, this approach allows one of the lanes to save energy when its result will be the same as the result generated by the other lane.

While FIGS. 14A/14B and 15 shows examples having two processing lanes, it is also possible to provide embodiments with more than two lanes of processing. In this case, it is possible to share the memoization table 24 between more than two lanes so that each lane updates the table and can look up results placed in the table by any of those lanes. Similarly, the comparison logic 310 may be expanded to compare the micro-operations processed by each respective pair of lanes. However, as the number of lanes gets larger it becomes more expensive to implement circuitry for sharing the results between different lanes and comparing the micro-operations in each lane. Eventually, the area and energy cost of implementing the comparisons and result forwarding may outweigh the savings obtained by reusing the result, and so it may be more efficient to limit the comparisons of micro-operations and reuse of results to certain lanes.

Figure 17:
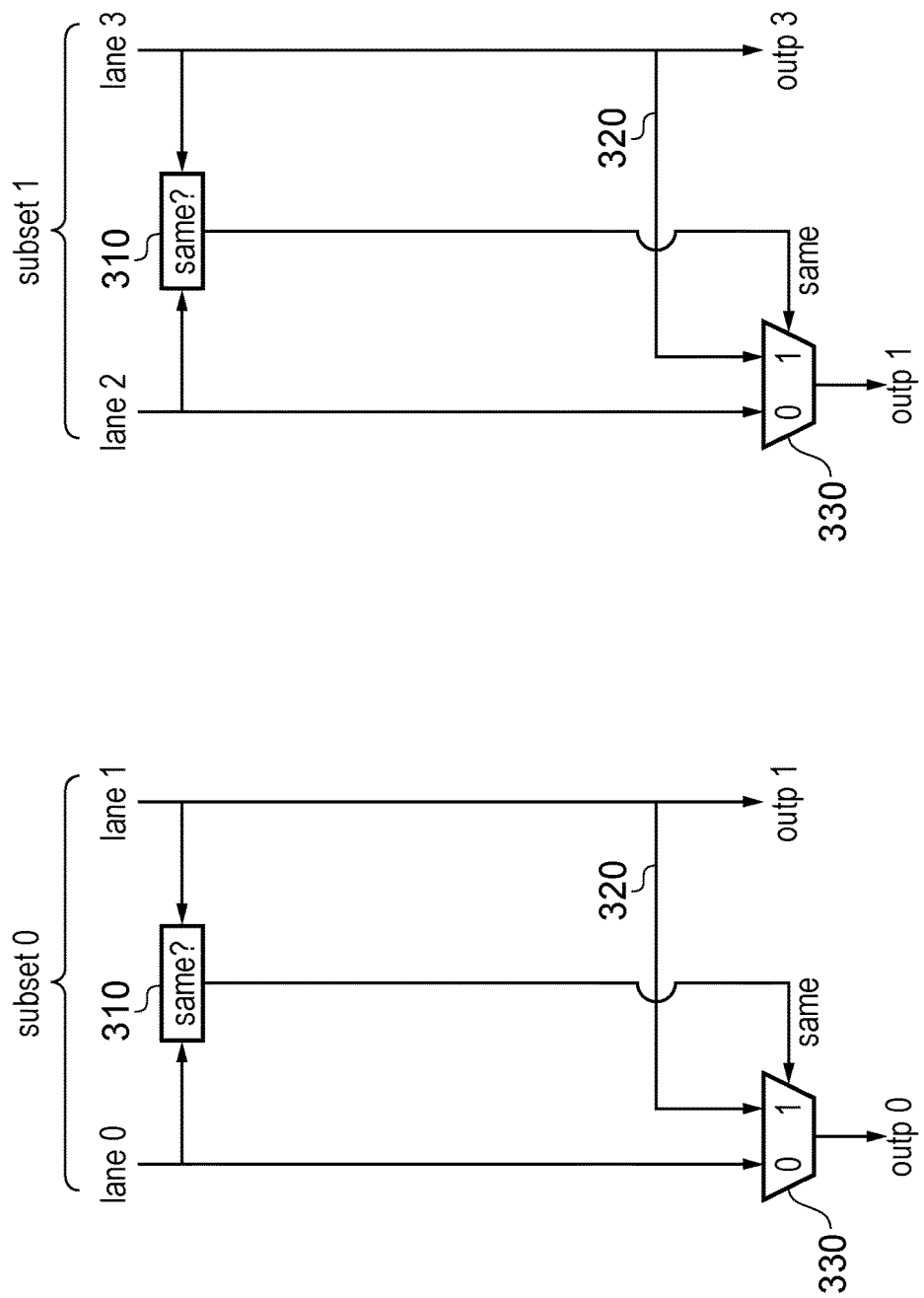
FIG. 17 shows an example of an apparatus having more than two lanes in which the lanes are partitioned into different subsets and only lanes within the same subset share results.

For example, as shown in FIG. 17 four processing lanes may be divided into two subsets each comprising two lanes. Only micro-operations in lanes within the same subset may be compared by the comparison logic 310. The forwarding path 320 and multiplexer 330 may only forward results from lanes within the same subset. Similarly, if there was a memoization table 24 then this would only be updated and looked up for results within the same subset of lanes (a separate memoization table 24 may be provided for other subsets). Hence, even if a micro-operation to be processed by a given lane would give the same result as another micro-operation processed in a different subset of lanes, the results would not be reused and instead the micro-operation would still be processed in the normal way. Even when the lanes are partitioned into subsets, the amount of reuse of results within the same subset is typically larger than reuse across different subsets (assuming threads are allocated to the lanes in a way that mirrors the spatial position of pixels represented by the threads or the arrangement of data elements within an operand). Therefore, an overall more energy and area efficient embodiment may be provided by limiting comparisons to subsets of lanes.

The techniques described above may be used in any processing system, and are especially useful where there is a reasonable probability of different micro-operations generating the same result. A non-exhaustive list of non-limiting examples where the present technique may be useful is provided below:

1) CPUs—(von Neumann, Harvard, warp, multi-threaded)
    Instruction decode
    floating point ALUs
        in superscalar cores, potential reuse in space
        in multithreaded cores, more identical back to back operations can be found (especially if the threads are in lockstep) example units: multipliers, dividers, adders/subtracters, reciprocals, dot products, square roots, implementation using iterative algorithms (Newton-Raphson)
    integer ALUs (dividers, multipliers, other kinds of fixed logic)
        more benefits in longer pipelines
    SIMD units (potential reuse both in time and space (across lanes))
    microcode fetch/generation for CISC
        complex translation of identical instructions can be accelerated or just gated. Partial reuse in case of "template" uop sequences.
    uTLBs, MMUs, as described below
2) DSPs/GPU (von Neumann, Harvard, warp, multi-threaded)
    Instruction decode
    ALUs
        FMAs, multipliers, adders etc (reuse across lanes if many)
    FIRs (Finite Impulse Response filters)—at a primitive level, e.g. multiplier, FMA (fused multiply-add) as above 3) GPUs
    general purpose floating point/integer ALUs
        reuse across threads (both in time, space) increased identical back to back operations in comparison with CPUs
        example units (similar to CPUs): multipliers, dividers, adders/subtracters, reciprocals, dot products, square roots, implementation using iterative algorithms (Newton-Raphson), fixed logic
        longer pipelines benefit even more
        filtering based on thread equivalence classes very applicable (quads etc)
    graphics specific operations (varying interpolation, texture filtering)
        reuse both at high level (e.g. interpolation) and at lower (primitive) level (e.g. multipliers, adders, adder trees)
        otherwise similar behavior to general ALUs in graphics pipelines (similar properties apply)
        abundant common value bypasses (trivial result generation) together with memoization,
    blending
        abundant common value multiplications and identical back to back operations.
    uTLBs:
        as below
4) Display Engines Composition engine/display controller
    blending, composition
    image enhancement
5) MMUs, uTLBs, MPUs
    translation/query for the same address occurs either back to back or close in time
    Clock gating or hiding the latency of the pipeline is very applicable at that case. Especially uTLBs are accessed more frequently (and at the same memory subrange→identical unit operation)
6) Caches, trace caches
7) Video encode & decode
8) Image Signal Processor (ISP)
    Demosaicing, lens correction noise reduction, filtering etc
    Image processing etc
9) Compression & decompression engines
10) Fixed function units that process data sets will similar information Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

The invention claimed is:

1. A data processing apparatus comprising:
    first and second processing lanes configured to perform data processing operations in parallel in response to micro-operations; and
    control circuitry configured to detect whether a first micro-operation to be processed by the first processing lane would give the same result as a second micro-operation to be processed in parallel with the first micro-operation by the second processing lane in dependence on operands specified by the first micro-operation and the second micro-operation and on operation identifiers indicating a data processing operation to be performed on the operands in response to each of the first micro-operation and the second micro-operation;
    said control circuitry comprising an operation identifier comparator to compare said operation identifiers;
    wherein if the control circuitry detects that the first micro-operation would give the same result as the second micro-operation, then the control circuitry is configured to prevent the first micro-operation from being processed by the first processing lane and to control the first processing lane to output the result of the second micro-operation as the result of the first micro-operation.

2. The data processing apparatus according to claim 1, comprising a result path configured to provide the result of the second micro-operation generated by the second processing lane to an output of the first processing lane.

3. The data processing apparatus according to claim 1, wherein the control circuitry is configured to detect that the first micro-operation would give the same result as the second micro-operation if one of the first micro-operation and the second micro-operation can be translated into the other of the first micro-operation and the second micro-operation.

4. The data processing apparatus according to claim 1, wherein the control circuitry is configured to prevent the first processing lane from processing the first micro-operation by placing at least part of the first processing lane in a power saving state during a processing cycle when said at least part of the first processing lane would otherwise be processing the first micro-operation.

5. The data processing apparatus according to claim 1, wherein the control circuitry is configured to prevent the first processing lane from processing the first micro-operation by preventing the first micro-operation from being passed to the first processing lane.

6. The data processing apparatus according to claim 1, wherein the second micro-operation comprises the micro-operation received for processing by the second processing lane in the same cycle as the first micro-operation is received for processing by the first processing lane.

7. The data processing apparatus according to claim 1, wherein the second micro-operation comprises the last valid micro-operation received for processing by the second processing lane.

8. The data processing apparatus according to claim 1, wherein the second micro-operation comprises an earlier micro-operation processed by the second processing lane.

9. The data processing apparatus according to claim 1, wherein the control circuitry is configured to detect whether the first micro-operation would give the same result as an earlier micro-operation processed by the first processing lane; and
    if the control circuitry detects that the first micro-operation would give the same result as the earlier micro-operation processed by the first processing lane, then the control circuitry is configured to prevent the first micro-operation from being processed by the first processing lane and to control the first processing lane to output the result of the earlier micro-operation processed by the first processing lane as the result of the first micro-operation.

10. The data processing apparatus according to claim 1, comprising a table configured to store at least one table entry for identifying an earlier micro-operation processed by one of the first and second processing lanes and a result of the earlier micro-operation;
    wherein the control circuitry is configured to perform a first table lookup to detect whether the table stores a corresponding table entry identifying an earlier micro-operation which would give the same result as the first micro-operation; and if the table stores the corresponding table entry, then the control circuitry is configured to prevent the first micro-operation from being processed by the first processing lane, and to control the first processing lane to output the result stored in the corresponding table entry as the result of the first micro-operation.

11. The data processing apparatus according to claim 10, wherein the control circuitry is configured to update the table with results of micro-operations generated by both the first processing lane and the second processing lane.

12. The data processing apparatus according to claim 10, wherein the control circuitry is configured to perform a second table lookup to detect whether the table stores a matching table entry identifying an earlier micro-operation which would give the same result as a current micro-operation to be processed by the second processing lane; and if the table stores the matching table entry, then the control circuitry is configured to prevent the current micro-operation from being processed by the second processing lane, and to control the second processing lane to output the result stored in the matching table entry as the result of the current micro-operation.

13. The data processing apparatus according to claim 10, wherein if the control circuitry detects that the first micro-operation would give the same result as the micro-operation received for processing by the second processing lane in the same cycle as the first micro-operation is received for processing by the first processing lane, then the control circuitry is configured to omit the first table lookup.

14. The data processing apparatus according to claim 1, comprising filtering circuitry configured to detect whether the first micro-operation satisfies at least one predetermined condition;

wherein if the filtering circuitry detects that the first micro-operation does not satisfy the at least one predetermined condition, then the control circuitry is configured to pass the first micro-operation for processing by the first processing lane without detecting whether the first micro-operation would give the same result as the second micro-operation.

15. The data processing apparatus according to claim 1, wherein the micro-operations received for processing by the first and second processing lanes in the same processing cycle correspond to instances of the same program instruction identified by a common program counter shared between the first and second processing lanes, with the operands for the micro-operations specified independently for each of the first and second processing lanes.

16. The data processing apparatus according to claim 1, wherein the operands comprise a plurality of data elements, the first and second processing lanes using respective data elements of the operands.

17. The data processing apparatus according to claim 1, comprising N processing lanes configured to perform data processing operations in response to micro-operations, where N>2;

wherein the N processing lanes comprise two or more subsets of processing lanes, each subset comprising fewer than N processing lanes; and the first and second processing lanes are processing lanes within the same subset.

18. The data processing apparatus according to claim 17, wherein if the control circuitry detects that the first micro-operation would not give the same result as the second micro-operation, then the control circuitry is configured to control the first processing lane to process the first micro-operation to generate the result of the first micro-operation, even if a micro-operation processed by a processing lane of a different subset to the first processing lane would give the same result as the first micro-operation.

19. A data processing method for a data processing apparatus comprising first and second processing lanes configured to perform data processing operations in parallel in response to micro-operations, the method comprising:

comparing, using an operation identifier comparator, operation identifiers indicating a data processing operation to be performed in response to a first micro-operation to be processed by the first processing lane and a second micro-operation to be processed by the second processing lane;

detecting whether the first micro-operation to be processed by the first processing lane would give the same result as the second micro-operation to be processed in parallel with the first micro-operation by the second processing lane in dependence on operands specified by the first micro-operation and the second micro-operation and on said operation identifiers indicating a data processing operation to be performed on the operands in response to each of the first micro-operation and the second micro-operation; and if it is detected that the first micro-operation would give the same result as the second micro-operation, preventing the first micro-operation from being processed by the first processing lane and controlling the first processing lane to output the result of the second micro-operation as the result of the first micro-operation.

* * * * *